(12) United States Patent
Hannah et al.

(10) Patent No.: US 9,507,820 B1
(45) Date of Patent: Nov. 29, 2016

(54) DATA MODELING SYSTEM FOR RUNTIME SCHEMA EXTENSIBILITY

(71) Applicant: Dell Software Inc., Aliso Viejo, CA (US)

(72) Inventors: Peter Douglas Hannah, Dartmouth (CA); Rodney Owen Willis, Travelers Rest, SC (US); Jose Roberto Antonio Duenas, II, Halifax (CA)

(73) Assignee: Dell Software Inc., Aliso Viejo, CA (US)

( * ) Notice: Subject to any disclaimer, the term of this patent is extended or adjusted under 35 U.S.C. 154(b) by 104 days.

(21) Appl. No.: 13/658,747

(22) Filed: Oct. 23, 2012

(51) Int. Cl.
G06F 7/00 (2006.01)
G06F 17/30 (2006.01)

(52) U.S. Cl.
CPC .............. *G06F 17/30424* (2013.01)

(58) Field of Classification Search
None
See application file for complete search history.

(56) References Cited

U.S. PATENT DOCUMENTS

| | | | |
|---|---|---|---|
| 6,021,437 A | 2/2000 | Chen et al. | |
| 7,263,512 B2 | 8/2007 | McGoveran | |
| 7,620,664 B2 | 11/2009 | McGoveran | |
| 7,640,264 B1 * | 12/2009 | Chaulk et al. | |
| 7,831,632 B2 | 11/2010 | Djugash et al. | |
| 1,029,579 A1 | 12/2011 | Venkatasubramanian et al. | |
| 8,639,670 B2 * | 1/2014 | Mineno | 707/692 |
| 2004/0193579 A1 * | 9/2004 | Dettinger et al. | 707/3 |
| 2005/0086239 A1 | 4/2005 | Swann et al. | |
| 2006/0085437 A1 * | 4/2006 | Brodhun et al. | 707/100 |
| 2007/0050323 A1 * | 3/2007 | Dettinger | G06F 17/30557 |
| 2008/0140636 A1 | 6/2008 | Brodhun et al. | |
| 2009/0182708 A1 | 7/2009 | Dettinger et al. | |
| 2012/0310996 A1 | 12/2012 | Kulack et al. | |

OTHER PUBLICATIONS

Atwood, "Coding Horror: Object-Relational Mapping is the Vietnam of Computer Science", http://www.codinghorror.com/blog/2006/06/object-relational-mapping-is . . . , (accessed Mar. 2, 2010) 3 pages, Jun. 26, 2006.
Maston, "Managing Windows with WMI", Microsoft TechNet, http://technet.microsoft.com/en-us/library/bb742445(d=printer?.aspx, (accessed Aug. 21, 2012) 11 pages, Nov. 1, 1999.
Microsoft TechNet, Windows Management Instrumentation (WMI): Frequently Asked Questions, Troubleshooting and Tips, http://technet.microsoft.com/en-us/library/ee692772(d=printer).aspx (accessed Aug. 12, 2012), 20 pages, Jul. 28, 2004.
NHibernate—Relational Persistence for Idiomatic .NET, NHibernate Reference Documentation, http://nhforge.org/doc/nh/en/index.html (accessed on Aug. 21, 2012), 160 pages.
Quest Software, Solution SOL49006: How to Add Extended Attributes in the Reporter Model, pp. 1-31, (accessed Aug. 25, 2012).
Nithin Mohan T K, SubSonic the ORM tool for .Net, http://www.nitrix-reloaded.com/2010/03/03/subsonic-the-orm-mapping-t . . . (accessed on Aug. 27, 2012), 1 page, Posted Mar. 3, 2010.
Adya et al, "Anatomyof the ADO.NET Entity Framework", Microsoft Corporation, pp. 877-888, Jun. 12-14, 2007.
Quest Reporter 6.6, User Guide, 160 pages, Sep. 2012.

\* cited by examiner

*Primary Examiner* — Thu Nga Nguyen
(74) *Attorney, Agent, or Firm* — Winstead PC

(57) ABSTRACT

Systems and methods for using a logical data model to at least partially address the deficiencies with existing ORM solutions are provided. In certain embodiments, the logical data model includes a layer that hides the underlying physical layout of tables in a database. The logical data model can act as a data management component that supports any subset of the following: 1) dynamic data modeling and schema management; 2) data set comparison and merge with historical tracking; and/or 3) data query.

18 Claims, 20 Drawing Sheets

FIG. 18

Domain Computer Information

Shows domain computer information for the selected domains.

- Domain: CB-DEV.DEV.HAL.CA.QSFT
- Organizational Unit: CB-DEV.DEV.HAL.CA.QSFT/Angela OU Computer: ANG-1 ☐ Is Hidden?
Operating System
Service Pack
Computer Type    Not Defined
Location         Location
Description      Description Computer: ANG-3 ☐ Is Hidden?
Operating System
Service Pack
Computer Type    Not Defined
Location         Location 2
Description      Description

- Organizational Unit: CB-DEV.DEV.HAL.CA.QSFT/Angela OU/Angela Sub OU

Computer: ANG-2 ☐ Is Hidden?
Operating System
Service Pack
Computer Type    Not Defined
Location         Location 3
Description      Description

1800

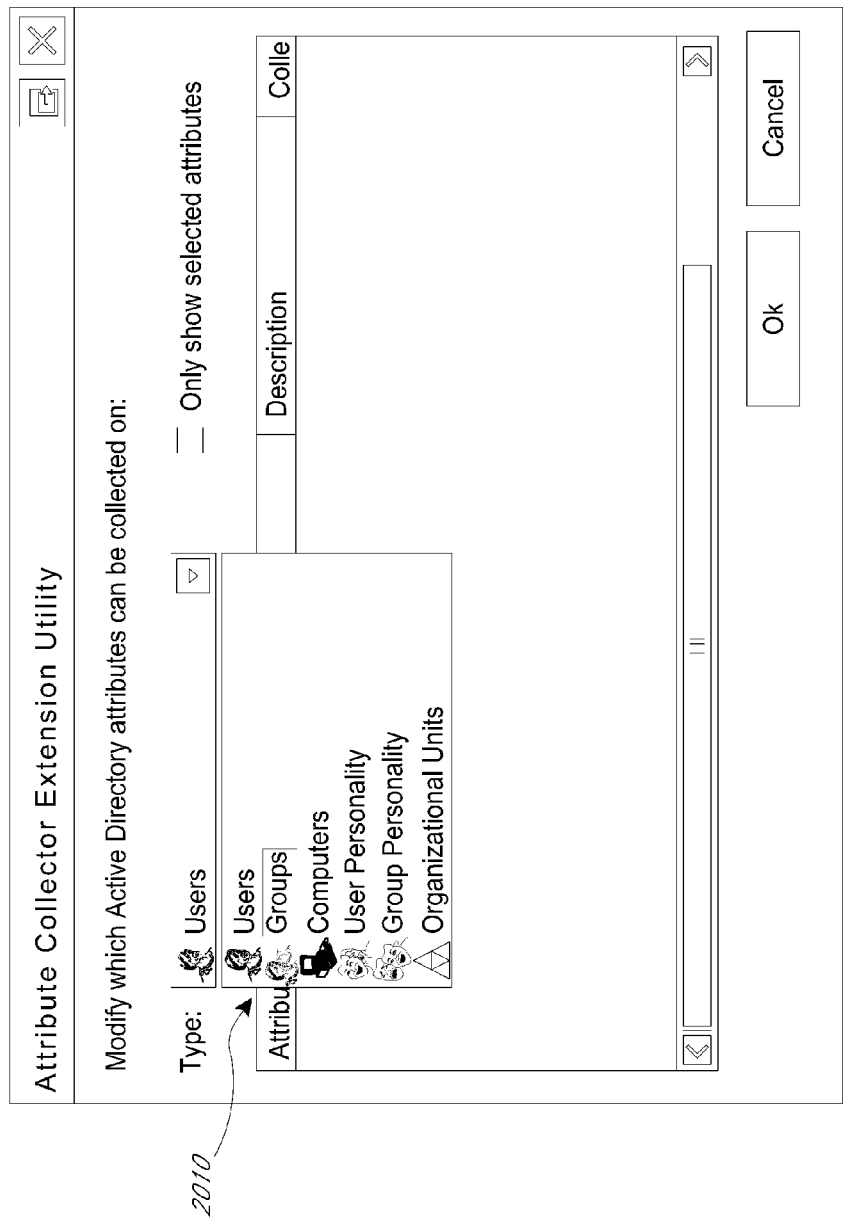

DATA MODELING SYSTEM FOR RUNTIME SCHEMA EXTENSIBILITY

BACKGROUND

A database is generally considered to be a collection of information or data organized in a way that computer programs can quickly access or select desired portions of the collection. A common type of database is the relational database, which maintains data in separate related files called tables. Databases, including relational databases, can be accessed and modified using a database management system (DBMS). Several relational-DBMS products are available from companies such as Oracle Corporation, IBM, and Microsoft as well as from various open-source vendors.

Object-relational mapping (ORM) tools add object-oriented capability to relational DBMS products. As a result, ORM tools can combine object-oriented modeling with the benefits of the relational database model.

SUMMARY

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

In certain embodiments, a method of extending a logical data model during runtime includes (by one or more first computer systems including computer hardware): tracking data regarding a plurality of attributes associated with a second computer system with a data collector, and receiving a request to track data on a new attribute associated with the second computer system, where the new attribute may not previously have been tracked by the data collector. The method can also include updating a logical data model to include the new attribute, where the logical data model includes a plurality of entities mapped to a schema of a physical database. The method may also include modifying the schema of the physical database to include the new attribute, as well as collecting data for the new attribute with the data collector. Further, the method may include using the logical data model to store the collected data in the physical database according to the modified schema. The logical data model may be dynamically bound, such that the updating of the logical data model may be performed without requiring recompilation of the data collector, the logical data model, or the physical database.

A system for extending a logical data model during runtime can include, in some embodiments, a data collector implemented in a first computer system having computer hardware. The data collector can collect data regarding a plurality of attributes associated with a second computer system. The system may also include an attribute extender that can receive a request to track data on a new attribute associated with the second computer system, where the new attribute may not previously have been tracked by the data collector, and update a logical data model to include the new attribute. The logical data model can include a plurality of entities mapped to a schema of a physical database. The system may also include a logical data model layer that can receive the new attribute from the attribute extender, adjust metadata in the logical data model to include the new attribute, and dynamically extend a schema of a physical database to include the new attribute during runtime without recompilation, thereby enabling the data collector in certain embodiments to store data for the new attribute using the logical data model.

Non-transitory physical computer storage can be provided that includes instructions stored thereon that, when executed by one or more processors, implement components for extending a logical data model during runtime. The components can include a data collector implemented in a first computer system having computer hardware. The data collector can collect data regarding a plurality of attributes associated with a second computer system. The system can also include an attribute extender that can receive a request to track data on a new attribute associated with the second computer system, where the new attribute may not previously have been tracked by the data collector, and update a logical data model to include the new attribute. The logical data model can include a plurality of entities mapped to a schema of a physical database. The components can also include a logical data model layer that can receive the new attribute from the attribute extender, adjust metadata in the logical data model to include the new attribute, and dynamically extend a schema of a physical database to include the new attribute during runtime without recompilation, thereby enabling the data collector to store data, in certain embodiments, for the new attribute using the logical data model.

In certain embodiments, a system for querying a database using a logical data model can include a logical data model having data representing a plurality of entities, each of the entities having one or more properties, and mappings to a plurality of physical database tables, where the mappings can map the entities to the plurality of physical database tables in a physical database. The system can also include a query engine having computer hardware. The query engine can receive, from a custom reporting application, a request for entity data of the logical data model. The requested entity data can be related to first properties of a selected one of the entities. Further, the query engine can access the logical data model to identify two or more of the physical database tables and associated columns in the two or more physical database tables to which the first properties of the selected entity are mapped, construct a query to access the two or more physical database tables in the physical database, pass the query to a database management system to cause the query to be executed on the physical database, receive results of the query from the database management system, and provide the results of the query to the custom reporting application to thereby enable the custom reporting application generate a report, including the results of the query, for presentation to a user.

In certain embodiments, a system for querying a database using a logical data model includes a logical data model having data representing a plurality of entities, each of the entities having one or more properties, and mappings to a plurality of physical database tables. These mappings can map the entities to the plurality of physical database tables in a physical database. The system also includes a query engine that can receive, from an application, a request for entity data of the logical data model, where the requested entity data can be related to first properties of a selected one of the entities. The query engine can also access the logical data model to identify two or more of the physical database tables and associated columns in the two or more physical database tables to which the first properties of the selected entity can be mapped, construct a query to access the two or more physical database tables in the physical database, cause the query to be executed on the physical database, receive results of the query from the physical database, and provide the results of the query to the application.

Non-transitory physical computer storage can also be provided that includes instructions stored thereon that, when executed by one or more processors, implement components for querying a database using a logical data model. The components can include a logical data model that includes data representing a plurality of entities, each of the entities having one or more properties, and mappings to a plurality of physical database tables. These mappings can map the entities to the plurality of physical database tables in a physical database. The system can also include a query engine that can receive, from an application, a request for entity data of the logical data model, where the requested entity data can be related to first properties of a selected one of the entities, access the logical data model to identify two or more of the physical database tables and associated columns in the two or more physical database tables to which the first properties of the selected entity are mapped, construct a query to access the two or more physical database tables in the physical database, and pass the query to the physical database to thereby cause the query to be executed on the physical database.

Moreover, in several embodiments, a method of querying a database using a logical data model can include (by a computer system comprising computer hardware) receiving, from an application, a request for entity data of a logical data model, where the logical data model comprising a plurality of entities, and where the requested entity data being related to properties of a selected one of the entities. The method can also include accessing the logical data model to identify two or more physical database tables in a physical database and associated columns in the two or more physical database tables to which the properties of the selected entity are mapped. Further, the method can include constructing a query to access the two or more physical database tables in the physical database and passing the query to a database management system that can execute the query on the physical database.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

FIGS. 15 through 18 depict example custom report generation user interfaces.

FIGS. 19 and 20 depict example attribute extension user interfaces.

DETAILED DESCRIPTION

I. Introduction

There are several deficiencies with existing ORM tools. Traditional ORM tools depend on static modeling of the data using code classes that are typically decorated with metadata attributes. These classes cannot be extended at runtime since they statically compile into a binary executable or DLL. Thus, ORM tools tend to require the developer to know and understand their complete data model at compile-time. Traditional ORM tools also typically use a one-to-one mapping between the modeled data and the underlying table in the database. Traditional ORM tools support direct object query, but do not usually allow for advanced queries to be built based upon the objects in the model and converted into a SQL query. Some exceptions to this do apply, most notably the ADO.NET Entity Framework. Moreover, traditional ORM tools do not provide any sort of data set comparison or data set merge capability, and as such, do not provide any sort of change history for the data. This would have to be built manually by the developer.

This disclosure describes systems and methods for using a logical data model to at least partially address the deficiencies with existing ORM solutions. In certain embodiments, the logical data model includes a layer that hides the underlying physical layout of tables in a database. The logical data model can act as a data management component that supports: 1) dynamic data modeling and schema management; 2) data set comparison and merge with historical tracking; and/or 3) data query.

II. Logical Data Model Embodiments

Figure 1:
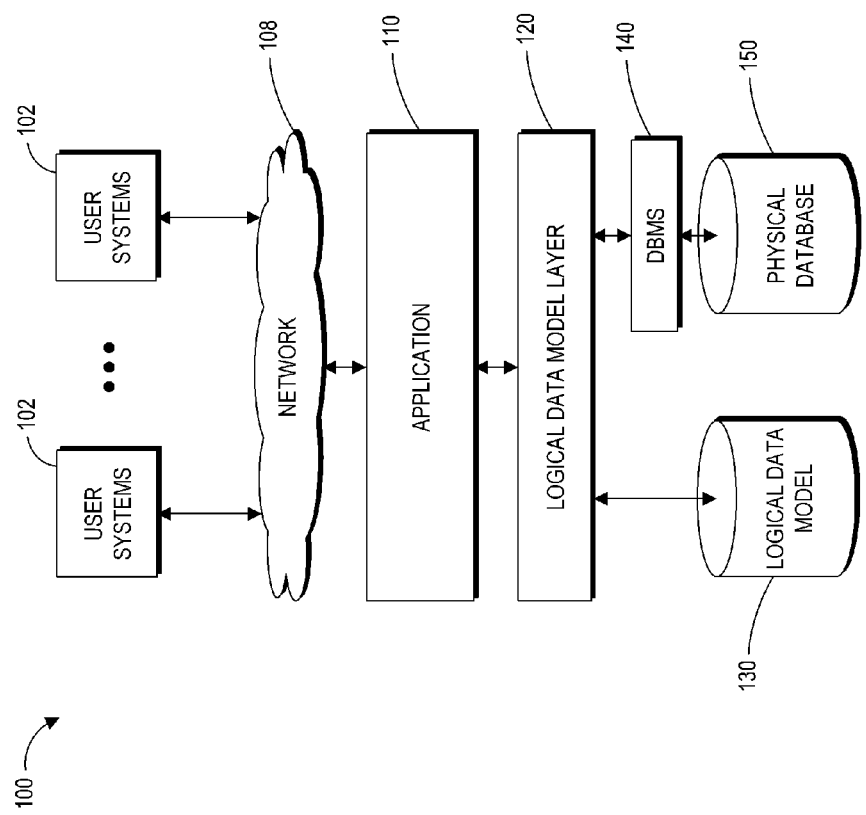
FIG. 1 illustrates an example computing environment that implements a logical data model.

FIG. 1 depicts an embodiment of a computing environment 100 that implements a logical data model (LDM). In the depicted embodiment, user systems 102 communicate with an application 110 over a network 108. The application 110 is in communication with an LDM layer 120, which provides access to an LDM 130 and a DBMS 140. The DBMS 140 is also in communication with a physical database 150. Advantageously, in certain embodiments, the LDM 130 provides several advantages for storing and processing data in the physical database 150. The LDM 130 can, for example, facilitate runtime extensibility of the application 110, including extensibility of types of data that can be stored in the physical database 150. In addition, the LDM 130 can facilitate easier understanding of relationships among the data in the physical database 150 as well as querying of the physical database 150.

The user systems 102 can each be any type of physical computing device such as, for example, a laptop, a computer, desktop, a tablet, a mobile computing device such as a mobile phone, a wireless phone, a smartphone or the like, or any other device having a processor and a memory. The user systems 102 can communicate with the application 110 over the network 108, which may be a local area network (LAN), a wide area network (WAN), the Internet, a local intranet or combinations of the same or the like. The application 110 can be any type of application accessible as a network application by user systems 102. The application 110 can be, for instance, a web application which can be accessed using a browser installed on the user systems 102. As another example, the application 110 can be an application server that is part of a network application or web application. The applicant 110 could have any of a variety of functions, such as data collection, performance monitoring, information technology analysis, virtual machine monitoring, network management, personnel management, customer relation management (CRM), or any combination of the same, among many other types of applications. In one embodiment, the application 110 is the Quest Reporter™ application current available from Quest Software™, Inc. of Aliso Viejo, Calif. More detailed descriptions of an example application 110 are described below with respect to FIGS. 12 through 20.

The application 110 communicates with the LDM layer 120 to retrieve and store data. In the context of a data collection application 110, for instance, the LDM layer 120 can facilitate storing data collected about users or about computers or any other object for which data is collected. Likewise, the application 110 can retrieve the stored data from the LDM layer 120. The LDM layer 120 can provide one or more routines that enable the application 110 to access or store this data. For instance the LDM layer 120 can provide an application programmer interface (API) or the like that enables the application 110 to communicate with the LDM layer 120. Advantageously, in certain embodiments, the LDM layer 120 can provide the application with object-oriented access to data through the LDM 130. The LDM 130 can include a series of tables or other data structures that present an entity-oriented view of data stored in the physical database 150. Entities in the LDM 130 can represent objects or items in the application 110 and relationships between other entities, objects, or items in the application 110. The LDM 130 can be implemented in physical computer storage, in memory, or in both.

For instance, in embodiments where the application 110 is a data collection application that monitors or collects data about computers in a network environment, the entities can include objects that represent those computers, user accounts, groups of user accounts, subcomponents of the computers, or the like. The entities can have properties and relationships with other entities, and the LDM 130 can map the entities, their properties and relationships to a physical schema in the physical database 150. The LDM 130 can advantageously provide some or all benefits of existing object relational mapping (ORM) tools, such as a less complex view of access to the physical database 150. In addition, the LDM 130 can provide other benefits not available in currently available ORM tools.

It should be noted that, in certain embodiments, the term "entity" and its derivatives, as used herein, in addition to having their ordinary meaning, do not merely denote relational tables that have relational relationships in an entity relationship diagram such as is commonly used to represent the structure of a physical database. Rather, in certain embodiments, the entities can represent any object or item in the application 110 (or other applications, the network 108, or other computing devices). Although such entities may be represented in a table or other data structure, the entities may or may not conform to normalization rules typical of the relational database model.

In certain embodiments, the LDM 130 can include a unified collection of data components. The LDM 130 can provide a standardized way of representing data. The LDM 130 can be a model that defines entities and the semantic relationship between them and can be used to automatically manage the physical schema in the physical database 150 corresponding to those entities. The LDM 130 can map logical entities, their properties and relationships between those entities to physical tables, columns and constraints in the physical database 150. In addition, the LDM 130 can provide a standardized way or approach for querying data in the physical database 150.

The LDM 130 can provide several benefits for application development, application features, and data storage. For instance, the LDM 130 can facilitate dynamic addition of properties and/or entities during runtime of the application 110, which can facilitate extensibility of the application 110 and the data stored by the application 110. Another benefit of the LDM 130 in certain embodiments is that the LDM 130 can be used to store data that the developers of the application 110 did not know about in advance. Existing systems attempt to provide this functionality by creating generic tables and storing all data as strings generically, for example, in key-value pairs. However, this generic approach is an inefficient way to store and represent data and access data subsequently. Another potential benefit of embodiments of the LDM 130 is that a single entity can be mapped to multiple tables and thus the LDM 130 may not be constrained by the one-to-one mapping between objects and tables that is common in existing ORM solutions. This one-to-possibly multiple type of mapping provided by the LDM 130 can further promote and enable runtime extensibility of the model.

In contrast, in certain embodiments the LDM 130 can store data in strongly typed format in the underlying physical database 150. For instance, if the data being stored is a number, the LDM 130 can store the data as a number in the physical database 150. Likewise, if the data is a date, the LDM layer 120 can store the data as a date in the physical database 150. Storing the data in the appropriate types instead of simply as strings can allow for more efficient database and application processing. In addition, since the LDM 130 is represented in tables and is therefore not statically compiled into an executable or dynamic linked library in certain embodiments like traditional ORM tools with classes, the LDM 130 can dynamically change at runtime.

Tools, such as a user interface and/or API can be provided by the LDM layer 120 to allow the LDM 130 to be updated dynamically, which in turn can cause the schema in the physical database 150 to be updated dynamically. For instance, a developer can access a user interface provided by the LDM layer 120 to explicitly add or update entities, properties, or relationships in the LDM 130. In response to a developer request to change the LDM 130, the LDM layer 120 can make one or more API calls to implement the change or changes to the LDM 130 and in turn to a schema in the physical database 150. In one embodiment, through API calls to the LDM layer 120, a developer of the application 110 (or the application 110 itself) can add new tables, new columns to tables, adjust columns of tables, or the like.

The LDM 130 can act as an interface for managing data as opposed to including the physical data itself. Thus, the LDM layer 120 can separate the interface from the implementation of the data, thereby freeing application programmers such as developers of the application 110 from having to understand the internal structure of the physical database 150. The structure of the LDM 130 can also be simpler than the structure of the physical database 150 and easier to understand due to intuitive relationships defined between the entities, as will be described in greater detail below. The LDM layer 120 can also provide functionality for data set comparison and merge features which are typically unavailable with traditional ORM tools.

As described above, one of the example applications 110 that can leverage the LDM 130 and LDM layer 120 is a data collection system that collects data about one or more resources such as applications, computing devices, users or the like and generates reports from the collected data. Such data can be collected from the user systems 102 or other systems that are connected to the network 108 and are not shown (see, however, FIG. 12). In embodiments where the application 110 is a data collection system, the data collection system may include a default set of reports that can be generated from the data in the database. As users obtain additional resources, users may wish to collect data about these resources. However, the schema in the physical database 150 might have to be modified in order to store data about the new resources. Similarly, if the user wishes to collect data or generate different types of reports about existing resources, the database schema can be modified. The LDM layer 120 and LDM 130 can advantageously enable modification of the data storage used by the data collection application and thereby facilitate extensibility of the data collection system.

The DBMS 140 may be a relational database management system. Accordingly, the tables in the physical database 150 may be relational tables that are related using relational constructs, constraints and the like. Although not shown, in other embodiments the LDM layer 120 can communicate with databases that are not relational, such as key value stores or other non-relational or No-SQL databases, some examples of which include Apache CouchDB, MongoDB, InfiniteGraph, Apache Cassandra, BigTable, Apache Hbase, and Apache Hadoop, among many others. In one embodiment, the LDM layer 120 communicates with a non-relational database through a relational layer, such as the SQL to no-SQL layers or features described in co-pending U.S. application Ser. No. 13/098,298, filed Apr. 29, 2011, titled "System for Providing Structured Query Language Access to Non-Relational Data Stores," the disclosure of which is hereby incorporated by reference in its entirety.

The physical database 150 can store the actual data collected by the application 110. For example, in the data collection system embodiment the application 110 can store data collected from other computing systems, users and the like in the physical database 150 according to the schema specified by the LDM 130.

Figure 2:
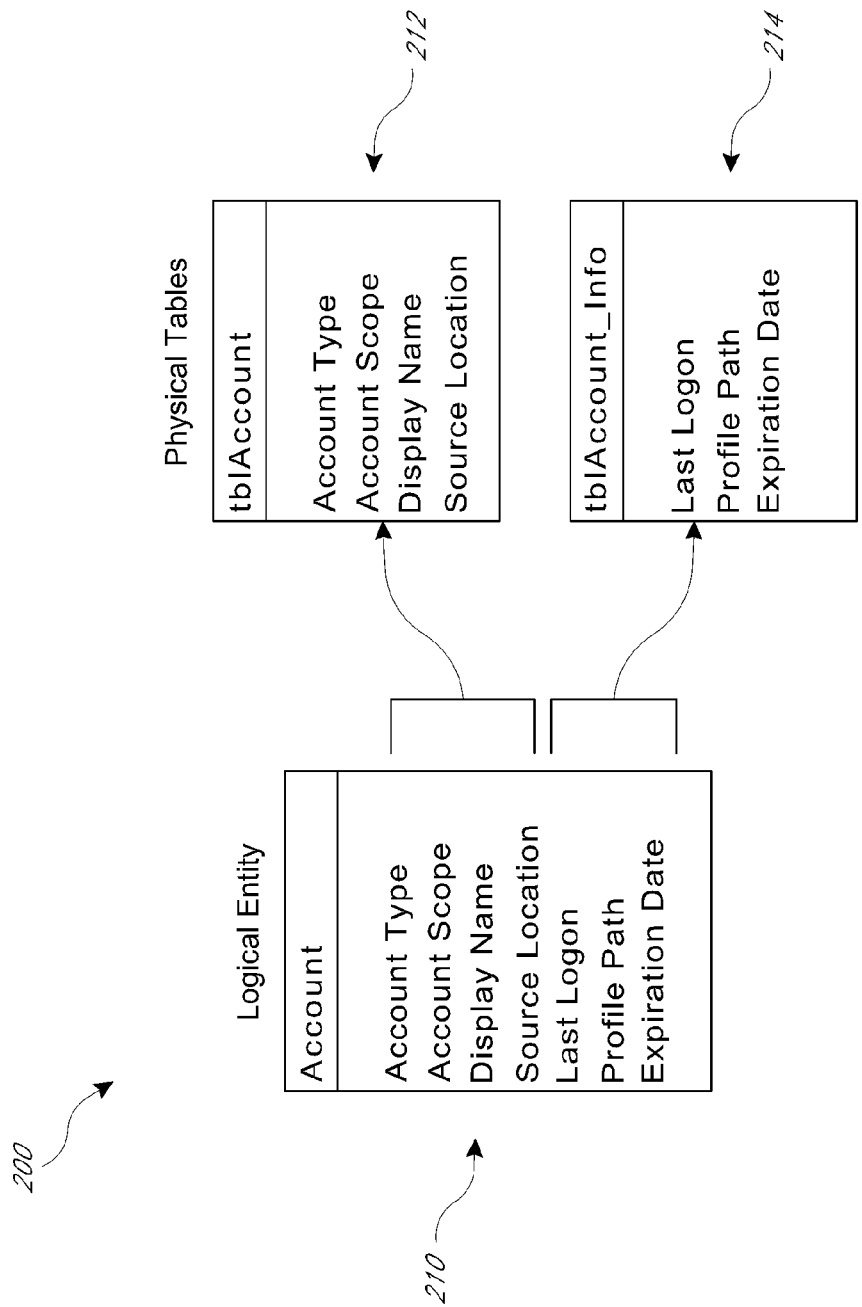
FIG. 2 illustrates example relationships between a logical data model and physical database tables.

FIG. 2 illustrates an example mapping 200 between a logical entity 210 of an LDM and physical tables 212, 214 of a physical database. The example mapping 200 shown can be implemented by the computing environment 100 described above, and in particular, by the LDM layer 120 and LDM 130.

In the depicted embodiment, the logical entity 210 is represented as a table called Account. The Account entity 210 has properties including Account Type, Account Scope, Display Name and so forth. The Account entity 210 could be used to define accounts of users. The logical entity 210 is mapped to two physical tables, 212, 214, which each include portions of the properties of the entity. The first table 212, a "tblAccount" table 212, includes column names such as Account Type, Account Scope, Display Name and Source Location. The second table 214, "tblAccount_Info," includes column names such as Last Logon, Profile Path and Expiration Date. Thus, the properties of the logical entity 210 are divided amongst the two physical tables 212, 214. The properties may be divided into multiple tables in a normalization process, as will be described in greater detail below.

Each property in the logical entity 210 is presented in human-readable form and is mapped to a physical table 212, 214 and column. Presenting entities and their properties in human-readable form can facilitate easier generation of queries from a user point of view, among other benefits. System level properties such as identifiers are not shown in the logical entity 210 to promote readability but may be included in the physical tables 212, 214, although they are also not shown in the physical tables 212, 214 in this example.

The properties of the logical entity 210 are shown in one logical entity whereas these properties are separated in the tables 212, 214 for efficiency and data access in storage. A query on the logical entity 210 can be processed by the LDM layer 120 to access the physical tables 212 and/or 214 to obtain the data from the physical database 150. In an embodiment, when a query for data from the logical entity 210 requests information for properties of the logical entity 210 that are stored in the physical tables 212, 214, the LDM layer 120 can perform a join or the like between the two physical tables 212, 214 to obtain the requested data. Accordingly, in certain embodiments the LDM layer 120 is able to hide at least part of the complexity of querying the physical database 150 while still maintaining the efficiency of querying relational tables. Building queries from the LDM can therefore be simpler than building queries directly on physical database because a user does not need to remember to join tables in various embodiments.

In the depicted embodiment, the mapping between the logical entity 210 and the physical tables 212, 214 is one entity to two tables (1:2). However, in other embodiments, a logical entity 210 can be mapped to any number of tables including one or several. Advantageously, in certain embodiments, allowing entities to map to more than one table such as the tables 212, 214 can facilitate objects such as entities not being bound to specific tables as occurs in currently-available ORM solutions. As will be seen below, the entity 210 could be extended to add additional properties which could be added to one or both of the tables 212, 214 or to a new table that is also mapped to logical entity 210.

In certain embodiments, one of the benefits of logical entities in the logical data model are the relationships and the way relationships are maintained in the LDM. These relationships, often referred to herein as semantic relationships, can provide greater meaning between logical entities than typical relations between physical database tables.

A problem in existing physical database tables is that traditional relational database models tend to use constraints to define relationships between tables. However, constraints tend not have any semantic meaning, and as such, are typically required to be interpreted completely by the consuming application. Further, database constraints are not easily understandable at first glance or usable to most users. Easy to understand relationships between entities in the LDM can facilitate data being separated in the physical layer for improved storage efficiency but presented as a single cohesive entity in a presentation or logical layer. Thus, semantic relationships can facilitate entities being used to group underlying properties together in logical cohesive units. In certain embodiments, the semantic relationships between logical entities can enable the interpretation of syntactic constraints in the relational database model which can allow automated construction of SQL queries with semantic relevance.

In some embodiments, the LDM can include three primary relationship types. The first type is the "IS" type. "IS" relationships can provide semantic support for entity inheritance. For example the statement, "a Group entity is an Account entity" (referring to Microsoft Active Directory™ groups and accounts) can mean that properties defined by an Account also apply to a Group. If a "SQL Server database entity is a SQL Server entity," as another example, this implies that the SQL server database cannot exist apart from the SQL server. From these examples, it can be seen that semantic relationships can reflect real-world relationships between objects more accurately than physical database relations, such as primary key and foreign key constraints.

Another type of semantic relationship is a "HAS" relationship or possessive relationship. The "HAS" relationship can add semantic support for entity decomposition or possession. For example, a "Service" entity can have (or HAS) a "Startup Account" in one implementation. One of the properties of a Service in Active Directory™ can be a Windows™ Account that the Service runs under, but that information can be separate and discrete from the Service information and may be more than just a single piece of data. Therefore, the physical storage of that data can be in two or more tables, but the Account entity information can be presented as an extension of the Service entity information in the LDM. Thus, in a "HAS" relationship, the deriving entity can contain additional properties not found in the base entity.

Another semantic relationship between entities can be a "Parent/Child" relationship. Parent/child relationships can provide semantic support for hierarchical entity relationships. Hierarchical entity relationships can be one-to-many relationships such as "a computer (entity) has many services (entities)." An individual service may not exist without a computer, and so the computer can be seen as the logical parent of the service. In an embodiment, a parent/child relationship is one where a first entity has a property which is its own entity, and the containing entity can possess some or all of the properties of the contained entity.

Having semantic relationships between entities instead of constraints as are found in relational database models can enable the LDM to seamlessly and dynamically evolve over time. In addition, another benefit of semantic relationships in certain embodiments is that semantic relationships can hide the more complex primary key or foreign key relationships of physical tables. Semantic relationships between entities can therefore be easier for users to visualize than relationships between physical tables.

Figure 3:
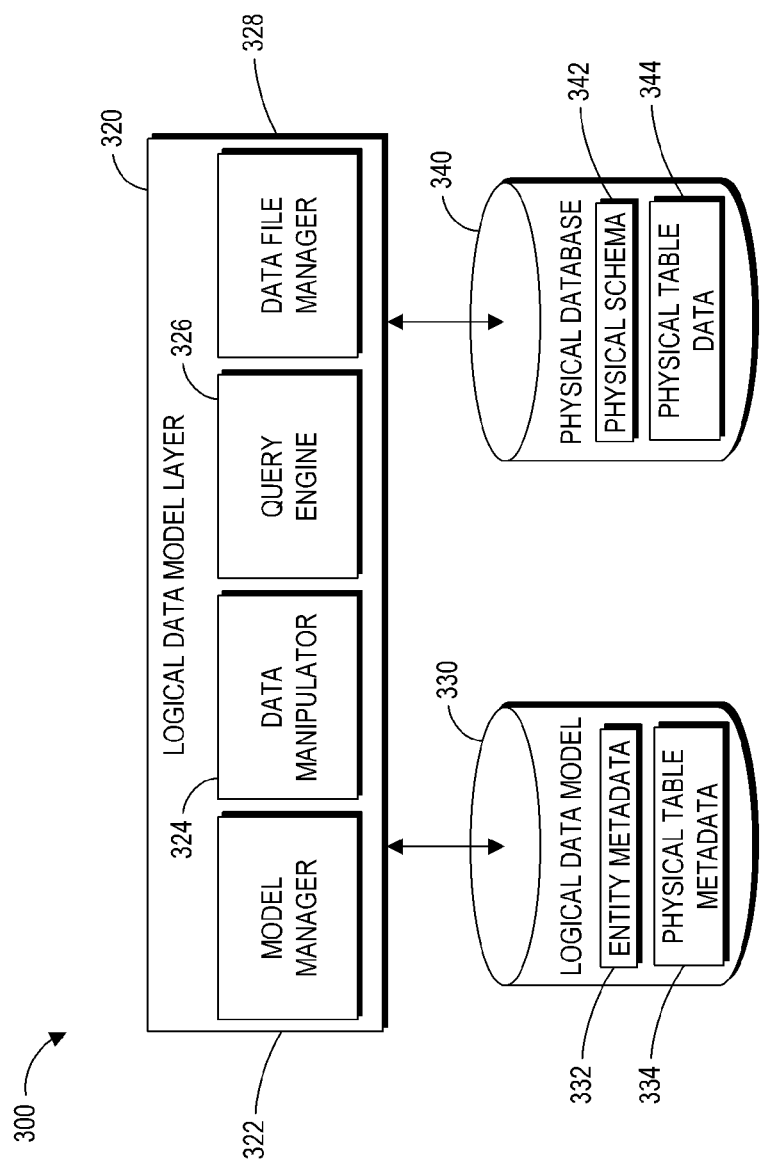
FIG. 3 illustrates example logical data modeling components.

FIG. 3 depicts a more detailed embodiment of an LDM layer 320, an LDM 330, and a physical database 340. Each of these components can have some or all of the functionality of their respective components described above with respect to FIG. 1. In the depicted embodiment, the LDM layer 320 includes a model manager 322, a data manipulator 324, a query engine 326, and a data file manager 328. Each of these components can be implemented in hardware and/or software.

The model manager 320 can be a tool that enables a schema to be constructed for the LDM 330. The model manager 322 can be used, for example, by software developers to initially create the LDM 330 or to modify the LDM 330 at runtime. In one embodiment, the model manager 322 outputs a user interface that enables visual creation of entities and defining relationships between entities as well as defining properties of those entities (see, e.g., FIGS. 7-9). Further, the model manager 322 can enable creation of mappings between entities and physical tables in the physical database 340. In one embodiment, the mapping between entities created in the LDM 330 and tables in the physical database 340 can be done automatically or at least partially automatically by normalization tools used by the model manager 322 instead of or in addition to by a user.

In addition, the model manager 320 can perform schema comparisons and upgrades of the schema in the LDM 330. The LDM 330 can allow for two data sets to be compared by the model manager 320 and the difference computed into a change list or delta. The change list can be applied to one of the data sets by the model manager 320 so that the newer data set is integrated into the older data set. One example scenario in which this data set may be used is a secondary dataset that is being merged into a master database. Additionally, during the application of the delta to the master database, the differences can be automatically recorded by the model manager 322 into a series of historical change-tracking tables (not shown). These change tracking tables can allow for change-over-time type queries to be written against the LDM 330.

Further, in some embodiments, the model manager 322 can provide functionality for importing and exporting the LDM 330. In addition, the model manager 322 can allow or enable creation of custom data types that allow an existing data type to be reinterpreted at runtime by the query engine 326. Custom data types are described in greater detail below with respect to the query engine 326.

The data manipulator 324 can provide an API or other routines for inserting, updating, and deleting entities in the LDM 330. The data manipulator 324 can therefore dynamically change the schema of the LDM 330 during runtime, for example, in response to requests from the application 110. Since data in the LDM is late bound or dynamically bound in certain embodiments, the data manipulator 324 can perform these changes to the LDM 330 without recompilation of the LDM 330, the LDM layer 320, or the application 110. In one embodiment, the data manipulator 324 communicates with an nHibernate ORM tool to store retrieved configuration data such as tables, relationships, and columns in the LDM 330. Further, the data manipulator 324 can compute snapshot deltas, apply transactional change data, and/or manage change history for the LDM 330.

The query engine 326 can receive entity-based queries and convert them to SQL-based queries for execution on the physical database 340. In some embodiments, because the query engine 326 allows queries to be generated based on an entity relationships in the LDM 330, the query model can be considered an object-oriented model rather than a relational model. In one embodiment, the query engine 326 provides a user interface that allows uses to write queries directly on the LDM 330 and then subsequently translates those queries to SQL queries on the physical database 340. Advantageously, in certain embodiments, providing such a user interface can increase ease of use for business users to obtain reports and data from the LDM 330. Alternatively, or in addition to providing a user interface, the query engine 326 can provide an API that receives requests for queries to be executed on the LDM 330 (e.g., from the application 110) and which in turn executes those queries on the physical database 340. Because of the cohesive nature of entities and because of the easy-to-visualize relationships between entities, the API provided by the query engine 326 can facilitate easier generation queries than direct SQL queries on the physical database 340.

The query engine 326 can also provide SQL dialect support to allow the query engine 326 to produce SQL statements for different types of target databases. The query engine 326 can be compatible with any type of relational database, some examples of which include Oracle™ databases, SQL Server™ databases, SQL Lite™ databases, MySQL™ databases, PostgreSQL™ databases and the like. In addition, the query engine 326 can provide multiple extension points to add, improve or otherwise modify the behavior of entity-oriented query construction at runtime. These extension points can facilitate dynamic report generation and are described in greater detail below with respect to FIG. 12.

In one embodiment, the query engine 326 translates entity-oriented queries into physical database queries by reading model definitions in the LDM 330. These model definitions can include entity metadata 332 and physical table metadata 334. Using this metadata, the query engine 326 can identify the appropriate tables to query in the physical database 340. The physical database 340 includes these tables in a physical schema 342 and actual data in the physical table data 344. Once the query engine 326 has identified the appropriate tables and columns corresponding to the entities and properties of the associated query, the query engine 326 can build the appropriate SQL query using the appropriate SQL dialect for the particular physical database 340 being queried.

The following is an example of code that can be used by the query engine 326 to programmatically generate SQL queries from logical entities.

| Data Query Example |
| --- |
| // Initialize SQL Query Builder |
| ISqlBuilder target = new SqlBuilder( ); |
| // Add properties to the "SELECT" clause |
| IEntityProperty computerprop1 = computerEntity.Properties["ComputerName"]; |
| IEnitityProperty serviceprop1 = serviceEntity.Properties["ServiceName"]; |
| target.AddReportProperty(computerprop1); |
| target.AddReportProperty(serviceprop1); |
| // Build "WHERE" clause |
| IFilter filter1 = new Filter( ); // Each filter is (prop)(op)(value) |
| filter1.LeftSide = computerprop1; |
| filter1.Op = PropertyOperator.NotEqual; |
| filter1.RightSide = "POLARIS"; |
| IFilterSet filterset1 = new FilterSet( );   // A filter set is analogous to |
| filterset1.AddFilter(filter1);    parenthesis |
| filterset1.Op = Log icalOperator.And; |
| target.SetFilterSet(filterset1);   // A query only has one |
| // Generate sqI statement    top-level filter set |
| String sqI = target.BuildQuery( ); |

The query generated by this example generates, at least in part, the following SQL syntax: "select * from table where ComputerName!="POLARIS."" The table name is not specified in this short example and may be derived elsewhere by the query engine 326. In addition, another property in this example ("ServiceName") can be, but may not be, part of the generated SQL query.

As described above with respect to the model manager 322, the query engine 326 can generate queries using the LDM 330 in conjunction with custom reporting extensions. These reporting extensions can allow the query engine 326 to interpret new data types defined by developers during runtime or at query time. The query engine 326 can also add in aliasing and localization of schema names and perform data transformations and look-ups for specific data elements. For example, a custom data type can be stored to allow a shorthand reference to translations in other languages for particular items of data. A number, for instance, can be stored in the physical table data 344, which corresponds to a foreign language translation of the item of data. Thus, the number "1" might correspondence to an English string, while the number "2" might correspond to a Spanish string for the same data, and so on. As another example, a custom data type can correspond to multiple columns in the database 340, and when retrieving data having that custom data type, the query engine 326 can interpret the custom data type to require retrieving the multiple columns. The query engine 326 can then retrieve the columns represented by the custom data type and combine those columns together. More generally, custom data types can define any type of data or combination of data and can thereby facilitate dynamic runtime extension of the LDM 330. When performing logic (e.g., as part of a query), however, the query engine 326 may compare the raw numbers stored in the physical table data 344 rather than the corresponding language strings in some embodiments. The query engine 326 can compare the strings instead of the numbers in other embodiments.

The data file manager 328 can create and initialize data files associated with the LDM 330 and/or physical database 340. The data file manager 328 can also export entity data from the LDM 330 to a data file and can manage versioning between data files.

The actual LDM 330 can be stored in a database and can have tables or other data structures divided into two portions or sides, including a logical side and a physical side. The logical side of the LDM 330 is represented by entity metadata 332 and the physical side is represented by physical table metadata 334. The entity metadata 332 can be a schema that provides a definition of entities, logical relationships to other entities, and mappings to physical tables. The physical table metadata 334 can be a schema that includes names of the physical tables in the physical database, columns, and constraints between those tables. The query engine 326 can use the logical entity metadata 332 to identify mappings of entities to physical tables and can use the physical table metadata 334 to determine how those physical tables are to be joined.

Figure 4:
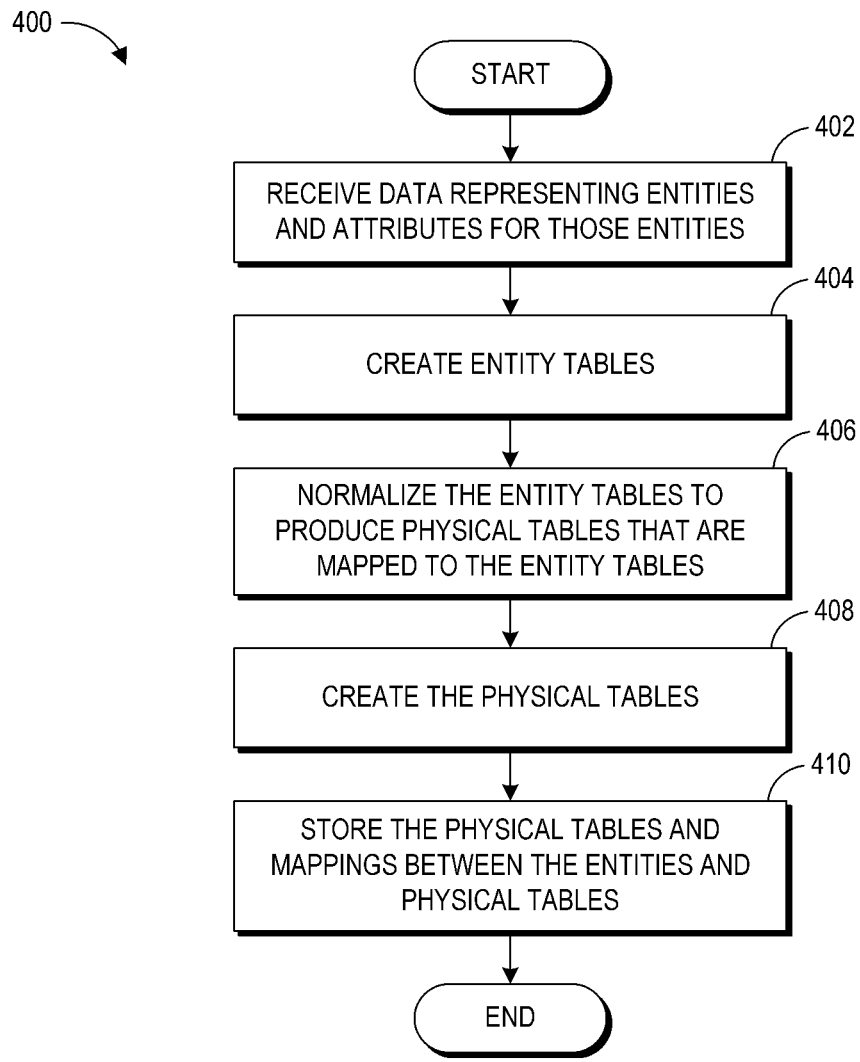
FIG. 4 illustrates an embodiment of a logical data model creation process.

FIG. 4 depicts an embodiment of an LDM creation process 400. The LDM creation process 400 can be implemented by any of the systems described herein, including the LDM layer 120 or 320 (or 1220 below). While any computing device or system could implement the process 400, for convenience the process 400 will be described as being implemented by the model manager 322. Advantageously, in certain embodiments, the model manager 322 can enable a developer or other user to create an LDM having the features and benefits described above.

At block 402 of the process 400, the model manager 322 receives data representing entities and attributes to those entities. The model manager 322 may, for instance, output a user interface (see, e.g., FIGS. 7-9) that can provide functionality for a user (such as a developer) to specify entities, attributes or properties for those entities, and relationships between those entities graphically. At block 404 of the process 400, the model manager 322 creates entity tables 404. The model manager 322 can create these entity tables by executing SQL create table statements or the like to create the entity metadata 332 and physical metadata 334 of the LDM 330. Alternatively, the model manager 322 can modify existing entity tables in an existing LDM to include the new entity and attribute information.

At block 406, the model manager 322 normalizes the entity tables to produce physical tables that are mapped to the entity tables. The model manager 322 can perform this normalization using currently-available normalization tools and may place the normalized physical tables in third normal form or some other form of normalization. At block 408, the model manager 322 creates the physical tables 408 in the physical database, for example, by executing one more SQL create statements. At block 410, the model manager 322 stores the physical tables as well as the mappings between the entities of physical tables. The model manager 322 can store the physical tables in the physical database while storing the mappings between the entities and physical tables in an LDM database, examples of which are described above.

Although the process 400 is described as being creating an LDM and then subsequently creating the physical tables from the LDM, in another embodiment the physical database tables may be created first and the LDM may be created subsequently. The model manager 322 can provide tools for creating the physical tables and then subsequently distilling entities, relationships, and their properties from the physical tables. The model manager 322 may also provide functionality for creating an LDM from an existing database. Further, in another embodiment, the model manager 322 can automatically create entities from tools that create names tables based on the physical database.

Figure 5:
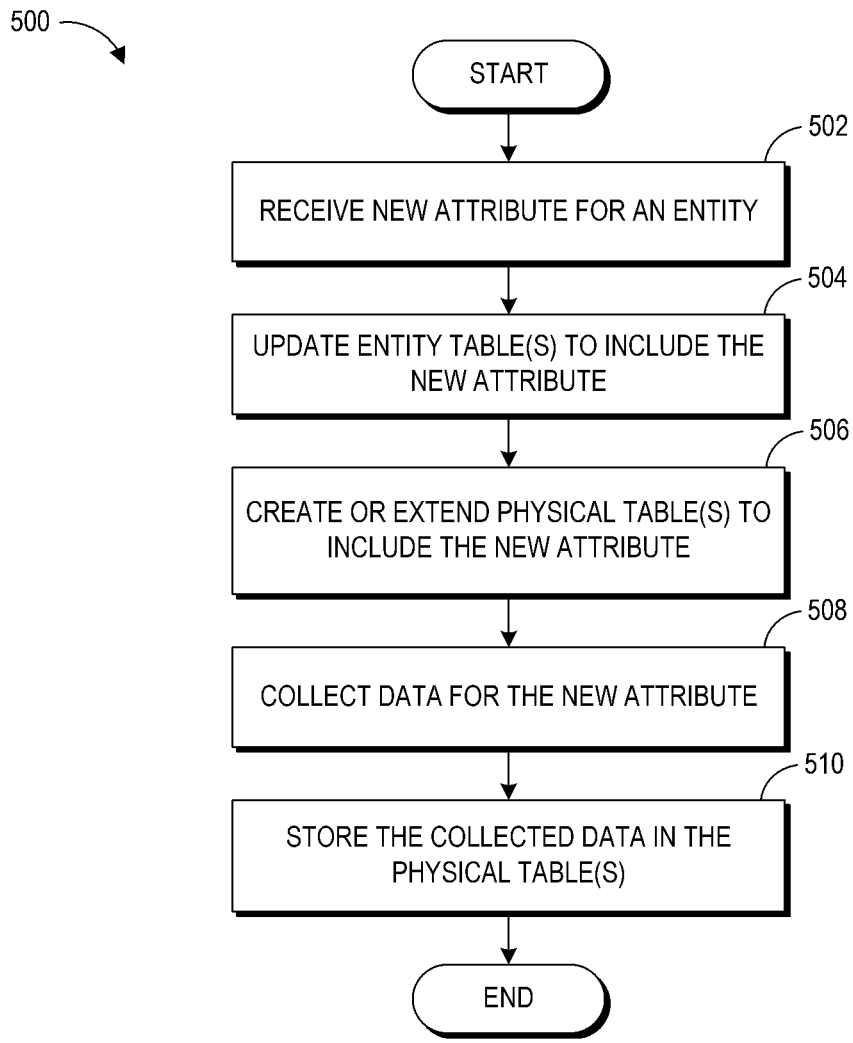
FIG. 5 illustrates an embodiment of a runtime model extension process.

FIG. 5 depicts an embodiment of a runtime model extension process 500. The runtime model extension process 500 can be implemented by any of the systems described herein, including any of the LDM layers 120 or 320 (or 1220 below). While any computing system or device could implement the runtime model extension process 500 for convenience and illustration purposes the process 500 will be described as being implemented by the data manipulator 324. Advantageously, in certain embodiments, the process 500 can change the LDM during runtime of an application (such as the application 110). A more detailed example version of the process 500 is described below with respect to FIG. 13 for an example custom reporting implementation.

At block 502, the data manipulator 324 receives a new attribute for an entity. The attribute can be a new attribute to be added to an existing entity or a new attribute for a new entity. The attribute can be specified by a user of the application 110, by a user of the model manager 322, by the application 110 itself or by a component that communicates with the application 110 (see, e.g., FIG. 12). At block 504, the data manipulator 324 updates an entity table or tables (or creates a new table) to include the new attribute.

At block 506, the data manipulator 324 can create or extend one or more physical tables to include the new attribute. At block 508, data can be collected for the new attribute, for example, by the application 110. The application 110 can collect data and send the data to the LDM layer 120, 320 to be stored. In response to receiving a request from the application 110 to store data, the query engine 326 of the LDM layer 120, 320 can store the data in the physical database tables at block 510.

Figure 6:
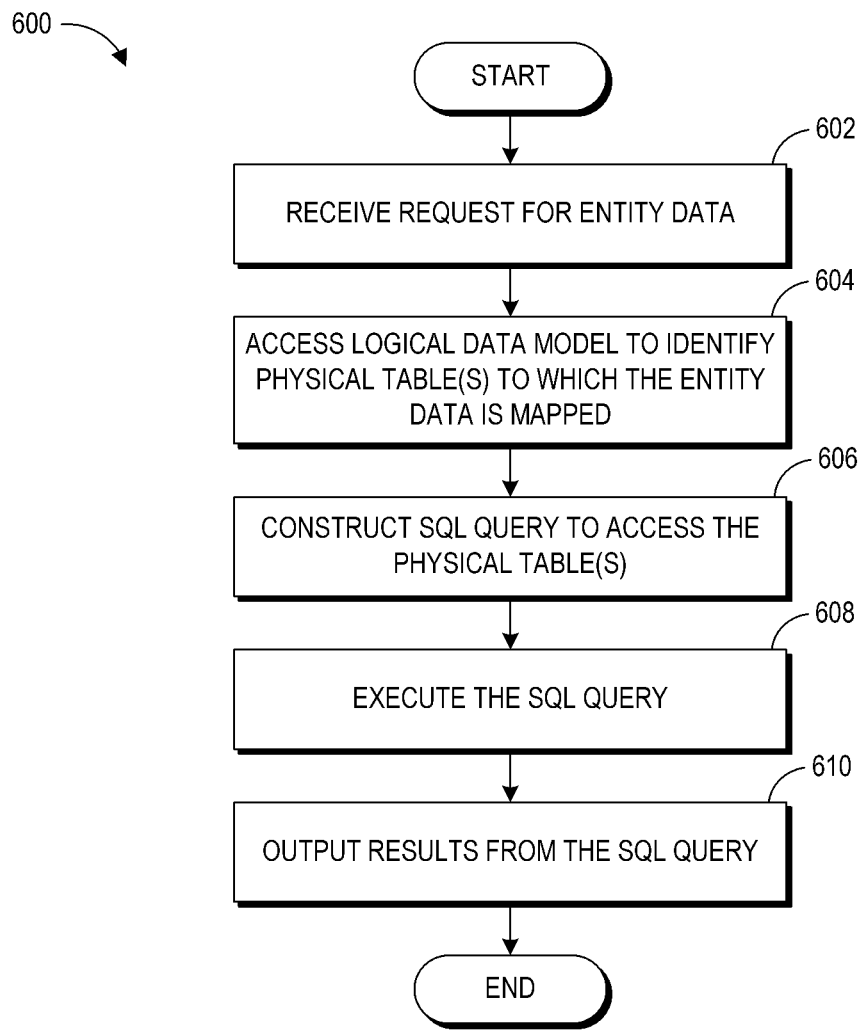
FIG. 6 illustrates an embodiment of a model query process.

FIG. 6 depicts an embodiment of a model query process 600. Like the processes 400 and 500, the model query process 600 can be implemented by any of the systems described herein including by the LDM layer 120 or 320 (or 1220 below). For purposes of illustration, the process 600 will be described as being implemented by the query engine 326 although any computer system or device can implement the model query process 600.

In the model query process 600, at block 602 the query engine 326 receives a request for entity data. For instance, the query engine 326 can receive a query from the application 110 of FIG. 1. The query can specify one or more entities for which data is to be obtained and/or stored. The query engine 326, in response to receiving this request, can access the LDM at block 604 to identify the physical table or tables to which the entity data is mapped. Once the physical table or tables are identified, the query engine 326 can construct a SQL query or queries to access the physical table or tables at block 606. For instance, if a single entity is specified in the entity query received at block 602, the query engine 326 can construct the SQL query to access multiple tables if the data to be obtained from the entity spans multiple tables. Accordingly, the query engine 326 can execute a join on the multiple tables. However, if the data to be obtained from the entity is contained in a single physical table, the query engine 326 can execute the query on that single physical table.

At block 608, the query engine executes the SQL query and outputs the results from the SQL query at block 610. The query engine 326 can execute the SQL query in one embodiment by providing a SQL statement or statements to the DBMS 140, which in turn performs the actual execution of the SQL query on the physical database 150. Alternatively, in some embodiments, the query engine 326 includes the functionality of a DBMS 140, obviating the use of a separate DBMS 140. The query engine 326 can output the results from the SQL query to the application 110, which can then use these results for any of a variety of reasons, such as to output them in a user interface or report or to use them for further processing that is not directly related to an immediate output on a display.

Figure 7:
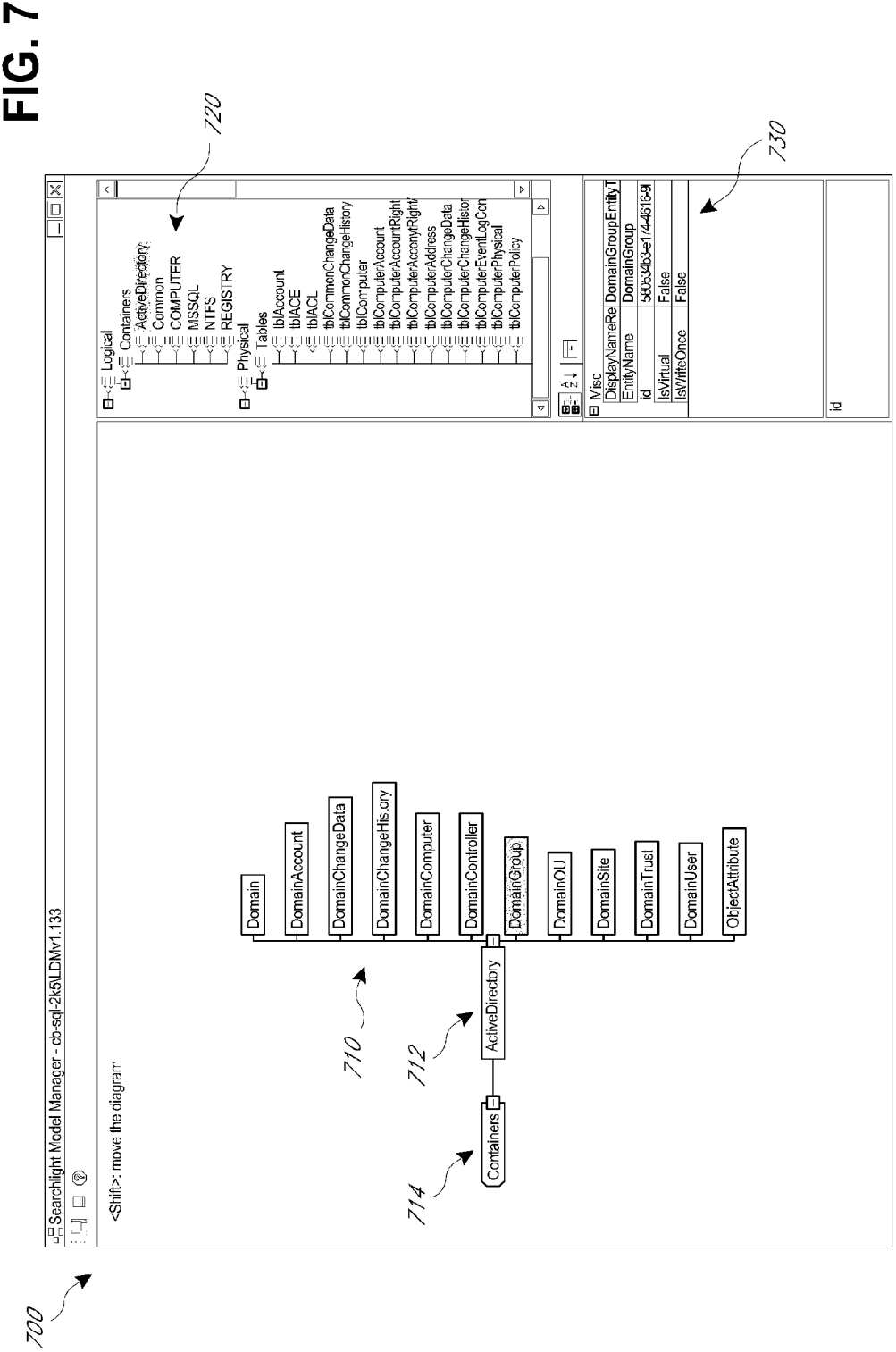
FIGS. 7 through 9 depict example model manager user interfaces.
Figure 8:
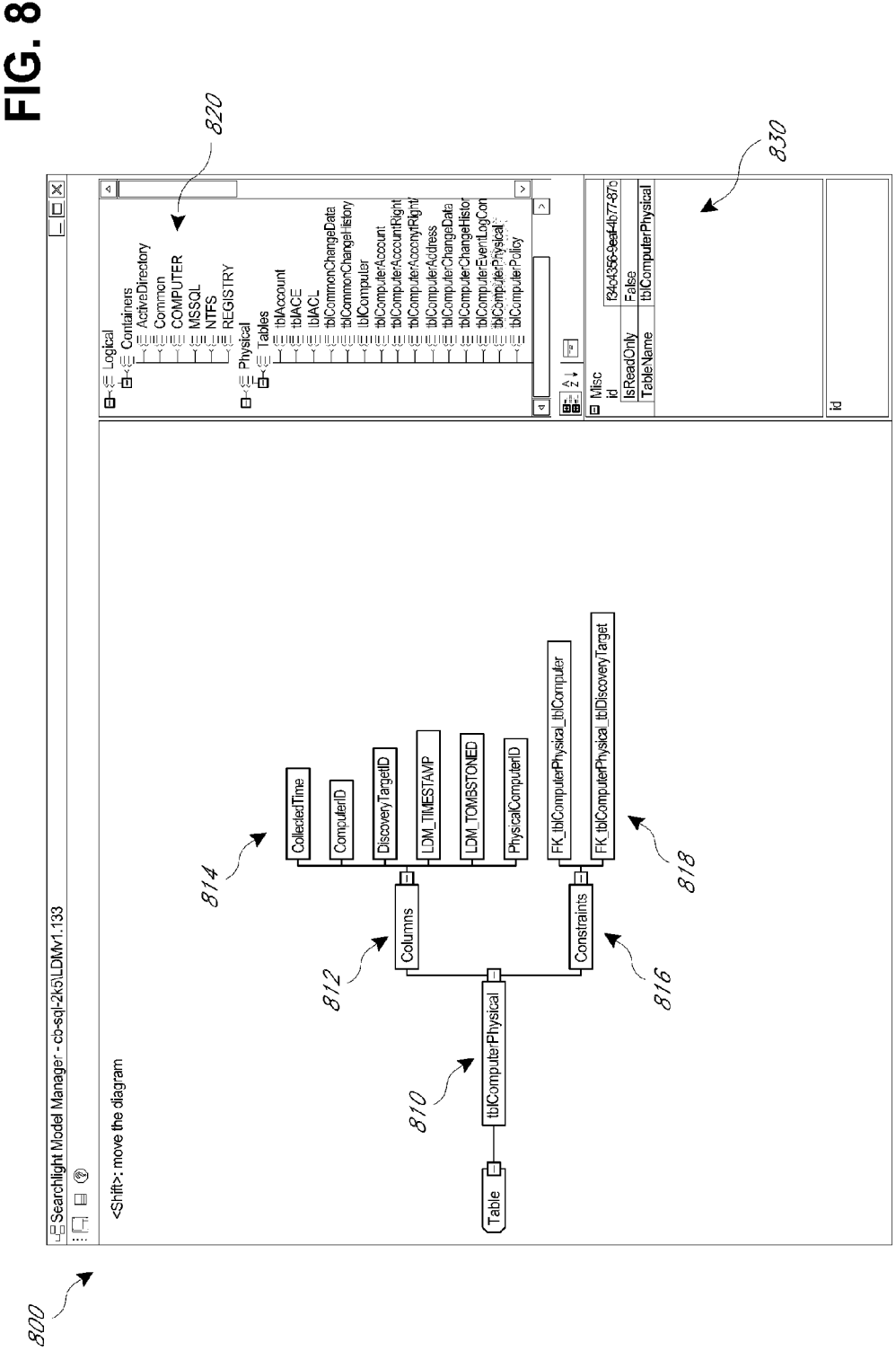
Figure 9:
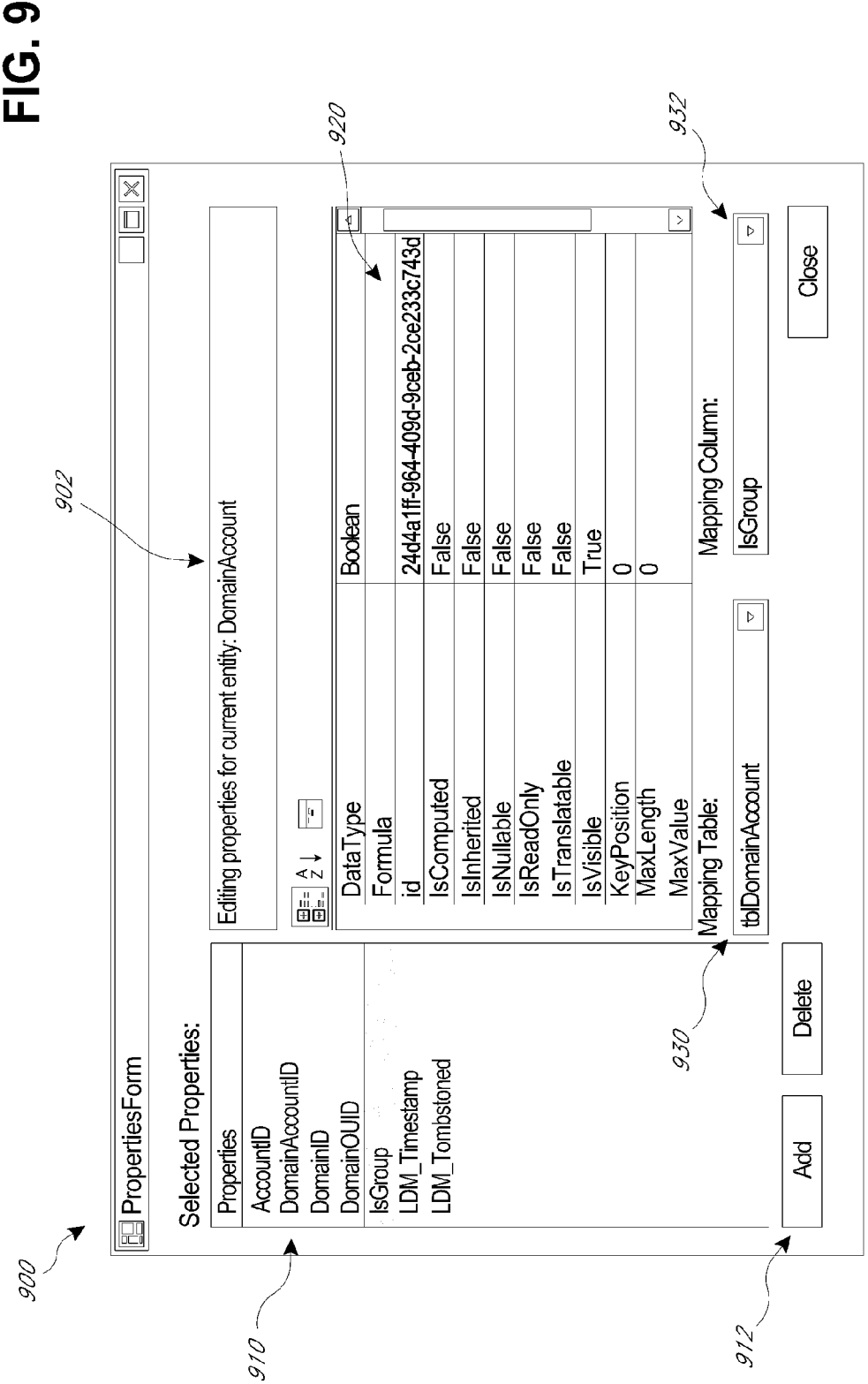
Figure 12:
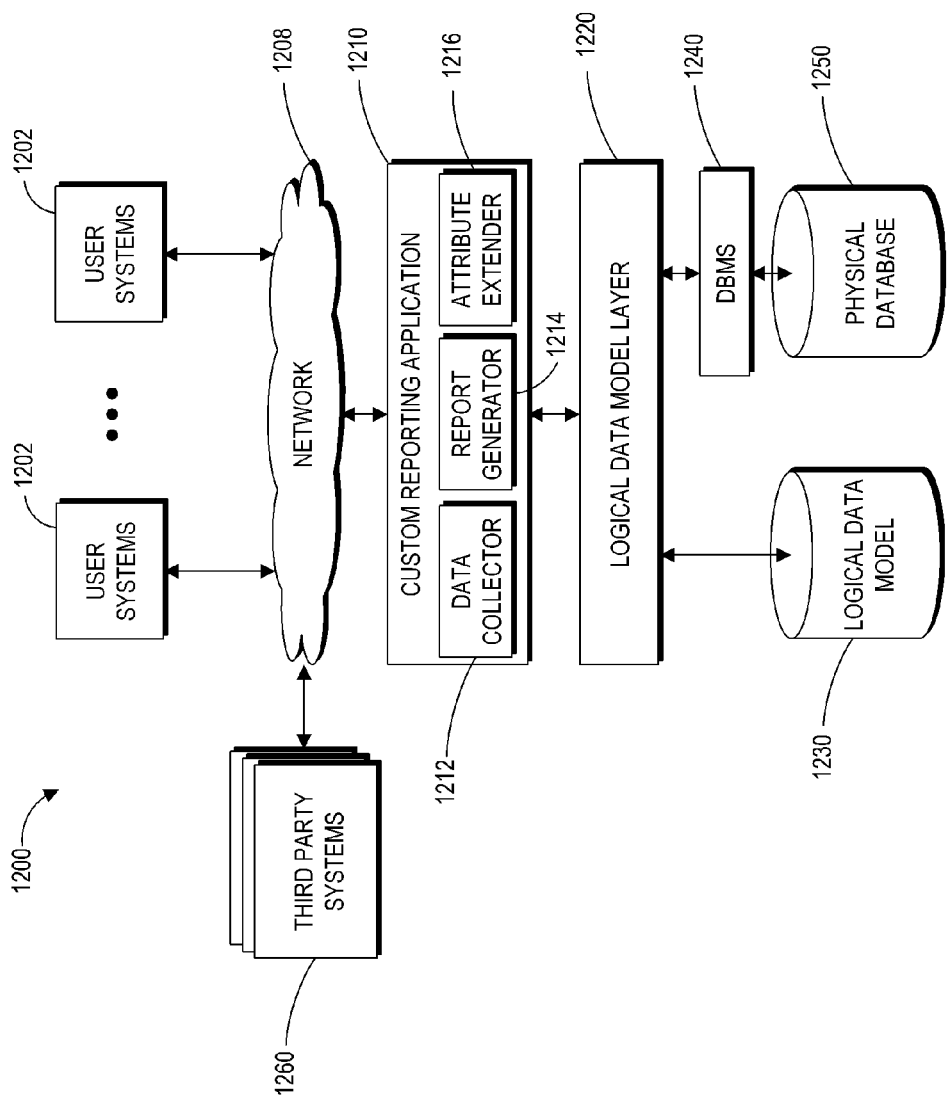
FIG. 12 illustrates an example computing environment that implements a logical data model in the context of data collection and custom report generation.

FIGS. 7 through 9 provide example user interfaces 700 through 900 that can be output by the model manager 322 of FIG. 3 or LDM layer 120 of FIG. 1 (or LDM layer 1220 of FIG. 12). In particular, FIG. 7 depicts a model manager user interface 700, FIG. 8 depicts a model manager user interface 800, and FIG. 9 depicts a model manager user interface 900.

Turning to FIG. 7, in the model manager user interface 700, various entities 710 are shown. These entities 710 are grouped together under a container 712. A container 712 can be a grouping of related entities 710. In the data collection and reporting example described in more detail below, each container 714 can correspond to a different application or system for which data is being collected and reported on. In the depicted embodiment, the container 712 is an Active Directory container 712, which is a subset of all containers 714. The Active Directory container 712 includes multiple entities 710 such as a Domain entity, DomainAccount entity, DomainChangeData entity, and so on. A subset of possible entities are shown for illustration purposes, although a container 714 may contain many more (or fewer) entities than those shown.

The user interface 700 can provide functionality for a user to select (e.g., click on) one of the entities 710 to explore properties of the entity 710 and/or change properties of the entity 710. In response to a user selection of an entity 710, such as by double-clicking, a property user interface 900 can be output to the user, described below with respect to FIG. 9. A properties pane 730 is also shown in the current user interface 700, which includes some or all of the properties of the entity 710 for viewing and/or modification. In addition, the user interface 700 includes an explorer pane 720 that enables a user to explore and select different containers, entities within those containers, and corresponding physical tables.

Turning to FIG. 8, the model manager user interface 800 shows an output that can occur when one of the physical tables specified in the explorer pane 720 is selected. Accordingly, the selected table name in the explorer pane 720, "tblComputerPhysical," is shown as a block 810 in the user interface 800. Related to the block 810 are shown categories of columns 812 and constraints 816 of the table 810. Specific columns 814 of the table 810 are shown as well as specific constraints 818. In this particular example, the columns 814 include column names such as CollectedTime, ComputerID, and so forth while the constraints 818 include foreign keys (FK) for the table 810. Another properties pane 830 is shown that enables properties of the table 810 to be edited and/or viewed. An explorer pane 820 is also shown as in FIG. 7. Selection of one of the tables 810, its columns 812/814, or constraints 816/818 can cause a properties display to be generated, such as a properties display similar to the entity-based properties display shown in FIG. 9 and described below.

Turning to FIG. 9, the model manager user interface 900 is a property user interface that allows properties 910 of a currently-selected entity 902 to be edited. The currently selected entity 902 in this example is the DomainAccount entity shown in the list of entities 710 in FIG. 7. Double clicking or otherwise selecting the domain account entity in FIG. 7 can cause the model manager user interface 900 to be displayed so that properties 910 of domain account entity 902 (or other entities) can be edited. These properties 910 include, in the depicted embodiment, such properties as AccountID, DomainAccountID, and so forth. A set of characteristics 920 for each property 910 can be edited by a user as well. In the depicted embodiment, the property 910 "IsGroup" is selected and its characteristics 920 are shown including its data type, which is a Boolean. The data type may be any data type such as string, Boolean, number, date, varchar, or the like.

Additional characteristics 920 are shown, such as whether the property 910 "IsGroup" is computed, is inherited, is nullable, is read only, its position, its max length, max value and so forth. User interface controls 912 including an add button and a delete button enable a user to add or delete properties 910. Characteristics 920 can be edited by clicking and typing on the characteristics 920. In addition, a drop down box 930 is shown for selecting a mapping table. In the drop down box 930, a user can select a table to map to this entity 902 and/or a property 910 of the entity. Likewise, the user can select a drop down box 932 to map the property 910 to a column in the table specified in the box 930. As described above, any of the properties 910 can be mapped to any table; thus multiple of the properties 910 can be mapped to one table while multiple of the properties could be mapped to another table using the drop down boxes 930, 932.

Figure 10:
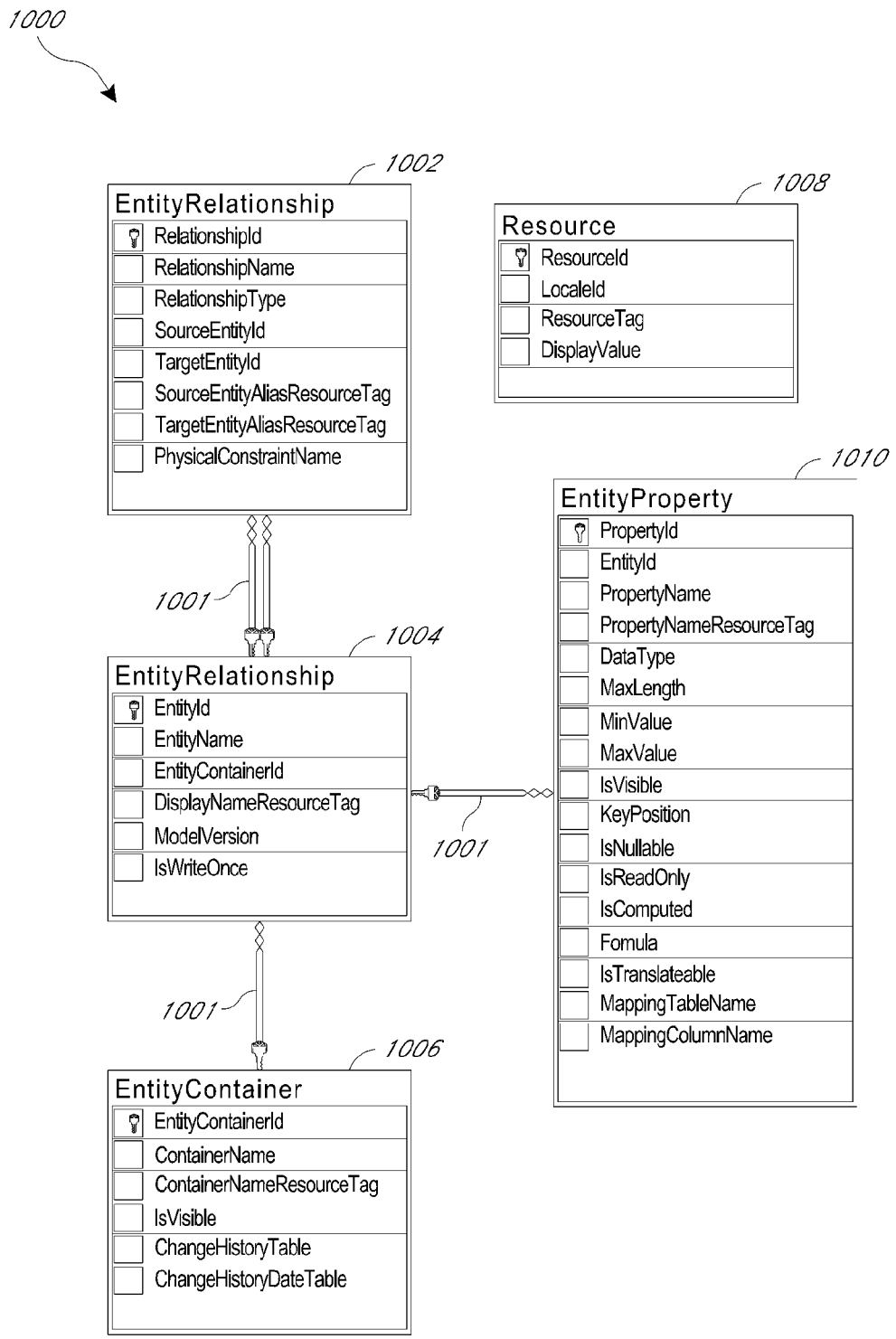
FIGS. 10 and 11 depict an example logical data model schema.
Figure 11:
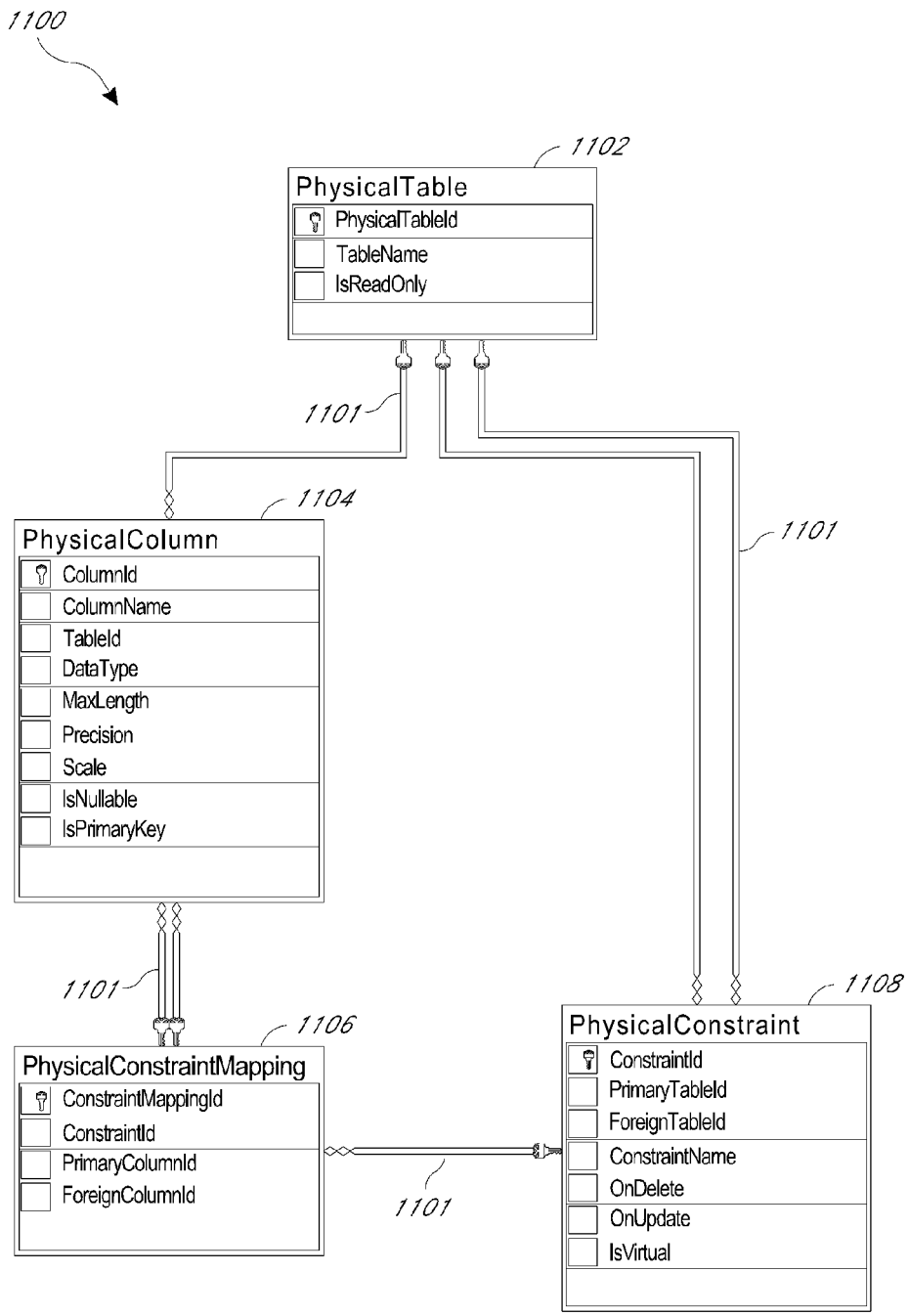

FIGS. 10 and 11 depict an example LDM schema, including an entity schema 1000 and physical table schema 1100. The entity schema 1000 is an example implementation of the entity metadata 322, whereas the physical table schema 1100 corresponds to the physical table metadata 334 of the LDM 330. Referring specifically to FIG. 10, the entity schema 1000 includes a plurality of tables 1002 through 1010 that represent information about entities, their relationships, and their properties, as well as containers and other aspects of the entity metadata of the LDM. The tables 1001-1010 in the depicted embodiment include an entity relationship table 1002, an entity table 1004, an entity container table 1006, a resource table 1008, and an entity property table 1010. Relations 1001 between each table are also shown.

Although entities, relationships, and properties are stored in relational tables 1002-1010 in this example, it should be understood that the relations 1001 between these tables 1002-1010 are not the same as the relationships between the entities. Rather, the tables 1002-1010 are data structures that store information or metadata about the entities, relationships, and their properties. The entities, relationships, and properties of the LDM could be stored in data structures other than relationship tables in some embodiments, including, for example, arrays, matrices, lists, vectors, trees, graphs, or the like.

The entity table 1004 can store information about entities including their entity names, the container IDs to identify the containers entities are in, as well as additional information. The entity container table 1006 lists the container names and container IDs. Thus, each entity in the entity table 1004 can be part of a container in the entity container table 1006. As described above, the entity containers can represent or encapsulate applications or target systems from which data is to be collected, or more generally any system for which the logical entities may be grouped together in one cohesive unit.

The entity relationship table 1002 includes relationship names and types such as the "Is," "Has," and "Parent/Child" relationships described above. The entity relationship table 1002 also includes columns for source entity ID and target entity ID, enabling a first entity (the source entity) and a second entity (the target entity) to be related based on a relationship type. The entity property table 1010 includes property names and several columns that correspond to the characteristics 920 of FIG. 9, including a mapping table name and a mapping column name. Thus, each property in the entity property table 1010 can be mapped to a table name and column name in the entity property table 1010.

The entity schema 1000 therefore enables components of the LDM layer 120 or 320 (or 1220) to look up information about entities, containers, properties, and relationships to thereby determine which entities and properties map to which tables and columns in the physical database. The entity schema 1000 thereby enables querying, data manipulation, and data addition and the like in the LDM. Because the properties are stored in an entity property table 1010 in the depicted embodiment, new rows can be inserted into the entity property table 1010 to create new properties for each entity. This procedure of adding or adjusting new properties by adding or adjusting rows to the entity property table 1010 can be done dynamically at runtime because the schema 1000 is represented in tables that are dynamically bound, rather than statically bound at compile time. Likewise, since the entities are stored in an entity table 1004, they can be added or otherwise modified at runtime as well. Entity relationships can also be added or modified in the entity relationship table 1002. The resource table 1008 can be used for reporting purposes (see, e.g., FIGS. 12-20) and can store localized versions of entity or property names, such as numbers in place of actual foreign language strings (as described above). These localized versions can be interpreted by an XML-layer or other layer (e.g., in the query engine 326) to include foreign language translations of entity or property names.

Turning to FIG. 11, the physical schema 1100 includes metadata about the physical tables in the physical database. While the physical database itself may include its own schema representing each table, the physical schema 1100 provides metadata about the physical tables that can enable the query engine 326 to translate entity-based queries to SQL queries. In addition, the LDM layer 120 or 320 (or 1220) can use the schema 1100 to generate a physical database having the tables constraints and other attributes shown.

The physical schema 1100 includes a "physical table" table 1102, a physical column table 1104, a physical constraint mapping table 1106, and a physical constraint table

1108. Relations 1101 connect the various tables. The "physical table" table 1102 lists table names and whether the tables are read only. The physical column table 1104 lists column names for each table as well as their data type, max length, and so forth. The physical constraint mapping table 1106 maps the column names of the physical column table 1104 to constraints in the physical constraint table 1108, including whether columns are primary keys or foreign keys. Thus the schema 1100 outlines the structure of the physical database, enabling construction of the physical database from the schema 1100 and/or efficient translation of entity queries to physical database queries. Like the schema 1000, the schema 1100 need not be stored in tables and could instead be stored in other data structures, such as arrays, matrices, lists, vectors, trees, graphs, or the like.

III. Data Collection and Reporting Embodiments

FIG. 12 depicts an example computing environment 1200 that implements an LDM in the context of data collection and custom report generation. The computing environment 1200 includes many of the features of the computing environment 100 of FIG. 1 and is a more detailed use case or example implementation of the computing environment 100. Like the computing environment 100, the user systems 1202 communicate over a network 1208 with an application 1210, which in this embodiment is a custom reporting application 1210. The custom reporting application 1210 communicates with an LDM layer 1220, which in turn communicates with an LDM 1230, a DBMS 1240, and physical database 1250. In addition, third party systems 1260 communicate with the custom reporting application 1201 over the network 1208. The third party systems 1260 can include any system or systems with which the custom reporting application 1210 can communicate to obtain data.

In the depicted embodiment, the custom reporting application 1210 collects data from the third party systems 1260 and generates custom reports related to the collected data. Users of the user systems 1202 can view and/or modify the custom reports provided by the custom reporting application 1210. The third party systems 1260 can include servers, systems, applications, or the like that provide various functionality. For example, a third party system 1260 could be the Active Directory™ system provided by Microsoft™ or could be the Windows Management Instrumentation™ (WMI) provided by Microsoft™. As described above, Active Directory™ is an example of a directory service for maintaining user account information, while WMI is an example of tools for remotely managing and gathering data about Microsoft Windows™ systems and associated components. In addition, the custom reporting application 1210 can gather information about the user systems 1202 themselves. Some of the Active Directory™ or WMI information, for example, may include information about user systems 1202.

In the depicted embodiment, the custom reporting application 1210 includes a data collector 1212, a report generator 1214 and an attribute extender 1216. Each of these components can be implemented in hardware and/or software. The data collector 1212 can include one or more routines that communicate with the third party systems 1260 and/or user systems 1202 to collect data. In some embodiments, the data collector 1212 can collect data about the network 1208, using for example the simple network management (SNMP) protocol or the like. In the Active Directory™ example, the data collector 1212 could communicate with an Active Directory™ third party system 1260 to obtain data about user accounts, groups, domains, login information, and other account management information associated with a network of user systems 1202. In the WMI example, the data collector 1212 can collect information from a WMI third party system 1260 related to computers (including optionally the user systems 1202), their subcomponents, performance and the like. The WMI system may also be locally installed on individual user systems 1202 instead of or in addition to in a third party system 1260. Other examples of systems for which the data collector 1212 can collect data include servers, databases, file systems, registries, NTFS storage, other computer storage, and the like.

The data collector 1212 can access the LDM layer 1220 to store the collected data in a physical database 1250 using the LDM 1230. The LDM layer 1220 can operate in the same or similar way as the LDM 120 or 320. The LDM layer 1220 may therefore store the collected data in entities in the LDM 1230 and as actual data in physical tables of the physical database 1250 via the DBMS 1240. The LDM layer 1220 may have additional features specific to the custom reporting application 1210, some examples of which will be described in greater detail below.

The report generator 1214 can access the stored data that has been collected by the data collector 1212 and generate reports on that data. For example, in the Active Directory™ use case, the report generator 1214 can provide reports on user logins, user accounts, domains, and so forth. The report generator 1214 may provide one or more user interfaces that enable users of the user systems 1202 to customize reports, create new reports or access template reports. In one embodiment, the report generator 1214 queries the LDM layer 1220 to obtain data for each report. The LDM layer 1220 can include a model manager, data manipulator, query engine, and/or data file manager that has all the functionality described above with respect to FIG. 3. For example, the query engine of the LDM layer 1220 can obtain data for custom reports from the physical database 1250 as specified by the LDM 1230.

The attribute extender 1216 can provide functionality for users of the user systems 1202 to expand the data that can be reported on and collected on by the data collector 1212 and report generator 1214. In some third party systems 1260, it is possible to extend the data collected by such third party systems 1260. For instance, in Active Directory™ systems it is possible to specify additional domains, users, groups or other types of data that can be collected on in a network environment. Once a user has added an attribute to the third party system 1260, that user may wish the custom reporting application 1210 to collect data for the new attribute so that custom reports may be generated for the attribute by the report generator 1214. The attribute extender 1216 provides functionality in certain embodiments for users to tell the custom reporting application 1210 of attributes that have been added in the third party systems 1260. The attribute extender 1216 may also programmatically access the third party systems 1260 to identify new attributes as they are created or periodically to determine whether new attributes have been created, e.g., via web service calls or other API access.

In one embodiment, the attribute extender 1216 outputs a configuration user interface that provides functionality for a user to specify which new attributes have been added to the third party systems 1260. In response to receiving this information, the attribute extender 1216 can access the LDM layer 1220 to extend the LDM 1230 to account for the new attribute or attributes. Advantageously, in certain embodiments, because the LDM 1230 can be extended during runtime without recompiling the LDM 1230 or the LDM layer 1220, it can be possible to easily extend the data collection capabilities and reporting capabilities of the custom reporting application 1210.

In response to a new attribute being added by the attribute extender 1216, the LDM layer 1220 (e.g., the data manipulator 324) can insert the new attribute as a property of an existing entity or as a new entity in the LDM 1230. The LDM layer 1220 may also generate a new physical table in the physical database 1250 in response to receiving the new attribute. Alternatively, the data manipulator 324 can extend an existing table in the physical database 1250 by adding one or more columns to account for the new attribute. In one embodiment, the LDM layer 1220 determines whether the physical table or tables to be extended in the physical database 1250 are locked due to being accessed prior to modifying those tables to avoid loss of data.

Advantageously, in certain embodiments, the LDM 1230 and LDM layer 1220 therefore allow customers to enjoy customizations they have made in applications such as the third party systems 1260 without having to pay to have the custom reporting application 1210 patched or updated. As a result, the LDM 1230 and LDM layer 1220 can facilitate more rapid software customization at lower costs than existing ORM systems.

The LDM layer 1220 may have various extensions to the functionality described above with respect to FIG. 3 in order to improve the functionality of the custom reporting application 1210. For instance, the query engine 326 may have multiple extension points to add, improve, or otherwise modify the behavior of entity-oriented query construction at runtime. Query processors are one example of extension points that can be provided so that queries generated by the query engine 326 can be modified during runtime in order to affect the return dataset for the custom report generated by the report generator 1214. Query processors can give developers flexibility in creating custom reports without having to recompile code. In addition, the query engine 326 can accept extensible data types as described above with respect to FIG. 3. Besides native data types such as strings, booleans, numbers, dates, etc. the query engine 326 can interpret new data types defined by the developers during runtime. Interfaces called interpreter interfaces can be provided by the query engine 326 so that developers can implement and plug in their data types into the system for extending the querying capability of the system.

Another example of an extension point, which can be included in the report generator 1214, is the ability to allow third party developers to customize layout processors. Layout processors can have full control over the layout rendering of a report generated by the report generator 1214. This extension point can allow developers to affect the output format of reports without the need to recompile code. For example, layout processors can dynamically create a subreport for data not specified by the user but that is associated with the full report generated by the report generator 1214 and can combine the subreport with the full report at runtime. Another extension point that can be used by the report generator 1214 is an extension point that enables XML configurable report types for the creation of custom reports at runtime. XML configurable report types can allow for multiple views over the same logical entity and can allow similar entities to be grouped together for a specific reporting purpose.

Although not shown, another possible use case for the LDM 1230 can be to keep track of customizations of a single application, such as the application 110 or 1210. When the application is upgraded to a new version, the upgrade process may cause some customizations of the application to be lost. However, with the LDM 1230 keeping track of those customizations, the new version of the application can keep those customizations, such that the upgrade process can therefore become version-agnostic. This benefit may be possible in certain embodiments because the LDM 1230 may keep an entity-oriented view of the customizations that can be independent of the actual implementation of those customizations. The LDM layer 1220 can reload the customized data into the new version of the application in a format expected by the new version of the application in certain embodiments because the entities in the LDM have stored that customization information in an implementation-independent way.

In some embodiments, the data collector 1212 and attribute extender 1216 can be used independent of the report generator 1214 to provide general data collection and attribute extension functionality. For example, these components can be used in conjunction with the LDM layer 1220 to perform general data storage. Likewise, the report generator 1214 can be implemented in some embodiments independently of the LDM layer 1220, such that reporting features described herein can be implemented independent of the LDM.

Figure 13:
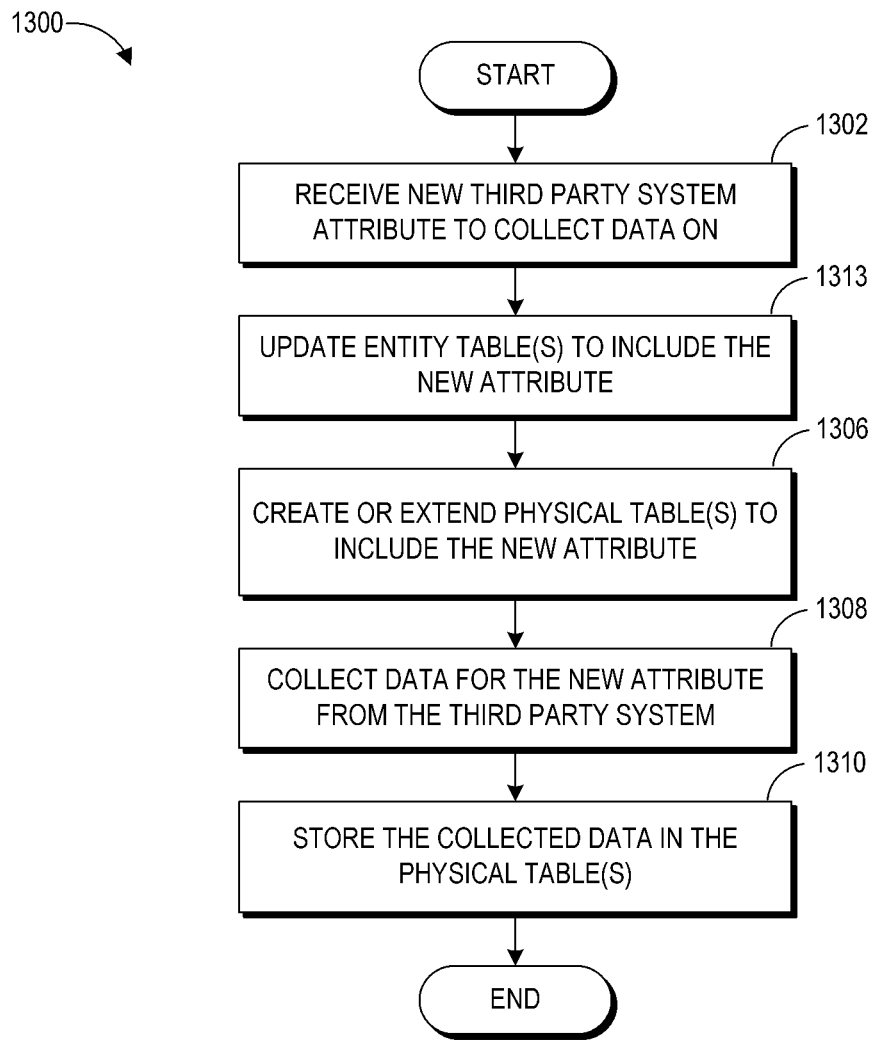
FIG. 13 illustrates another embodiment of a runtime model extension process.

FIG. 13 depicts another embodiment of a runtime model extension process 1300. The runtime model extension process 1300 can be implemented by any of the systems described herein, including the LDM layers 120, 320, and 1220 described above with respect to FIGS. 1, 3, and 12. The runtime model extension process 1300 can include all of the features of the runtime model extension process 500 of FIG. 5. In addition, the features of the custom reporting application 1210 can be used in conjunction with the LDM layer 1220 to perform the runtime model extension process 1300.

At block 1302, the LDM layer receives a new third party system attribute to collect data on. The attribute may be provided to the LDM layer by the attribute extender 1216 of the custom reporting application 1210 and may be an attribute entered into the third party system or systems 1260 for which a user now wishes to collect data. At block 1313, one or more entity tables are updated by the LDM layer to include the new attribute, and the LDM layer creates or extends the physical tables corresponding to those entity tables at block 1306 to include the new attribute. The data collector 1212 of the custom reporting application 1210 can collect data for the new attribute from the third party system at block 1308 and provide this data to the LDM layer 1220. The LDM layer 1220 can store the collected data in the physical tables via the DBMS 1240 at block 1310.

Figure 14:
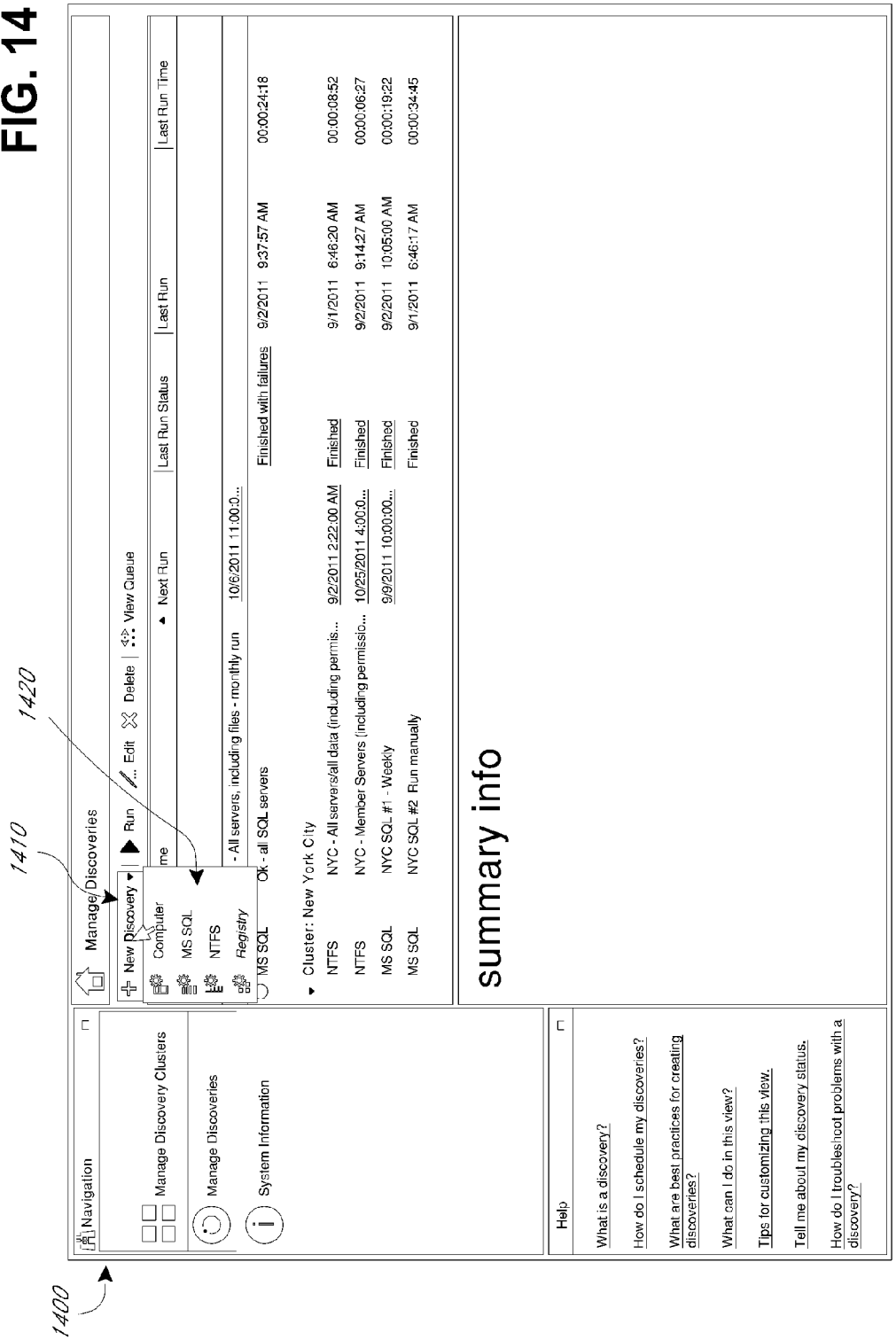
FIG. 14 depicts an example data collection user interface.

Turning to FIG. 14, an example data collection user interface 1400 is shown. The example data collection user interface 1400 can be generated by the data collector 1212 of FIG. 12 and can be used by users to specify collections of data to be made on third party systems 1260. In the user interface 1400, a new discovery button or user interface control 1410 is provided that can be selected by a user to start a new data collection. Upon selection of the user interface control 1410, a drop-down box 1420 of options is made available. The drop down box 1420 lists third party systems 1260 that can be monitored or otherwise accessed for data collection by the data collector 1212.

A user can select one of these third party systems 1260 to specify a discovery to be run to collect data which can be scheduled to run at certain times or could be run on an ad-hoc basis in response to user input. In the example embodiment shown, these third party systems include a "computer system," which can include an Active Directory™ system, a Microsoft SQL Server™, an NTFS storage system, and a registry system (such as registry of one or more Windows™ computing systems). The user interface 1400 can be output in a web browser or other application software that can be accessible by the user systems described herein for example over a network.

Figure 15:
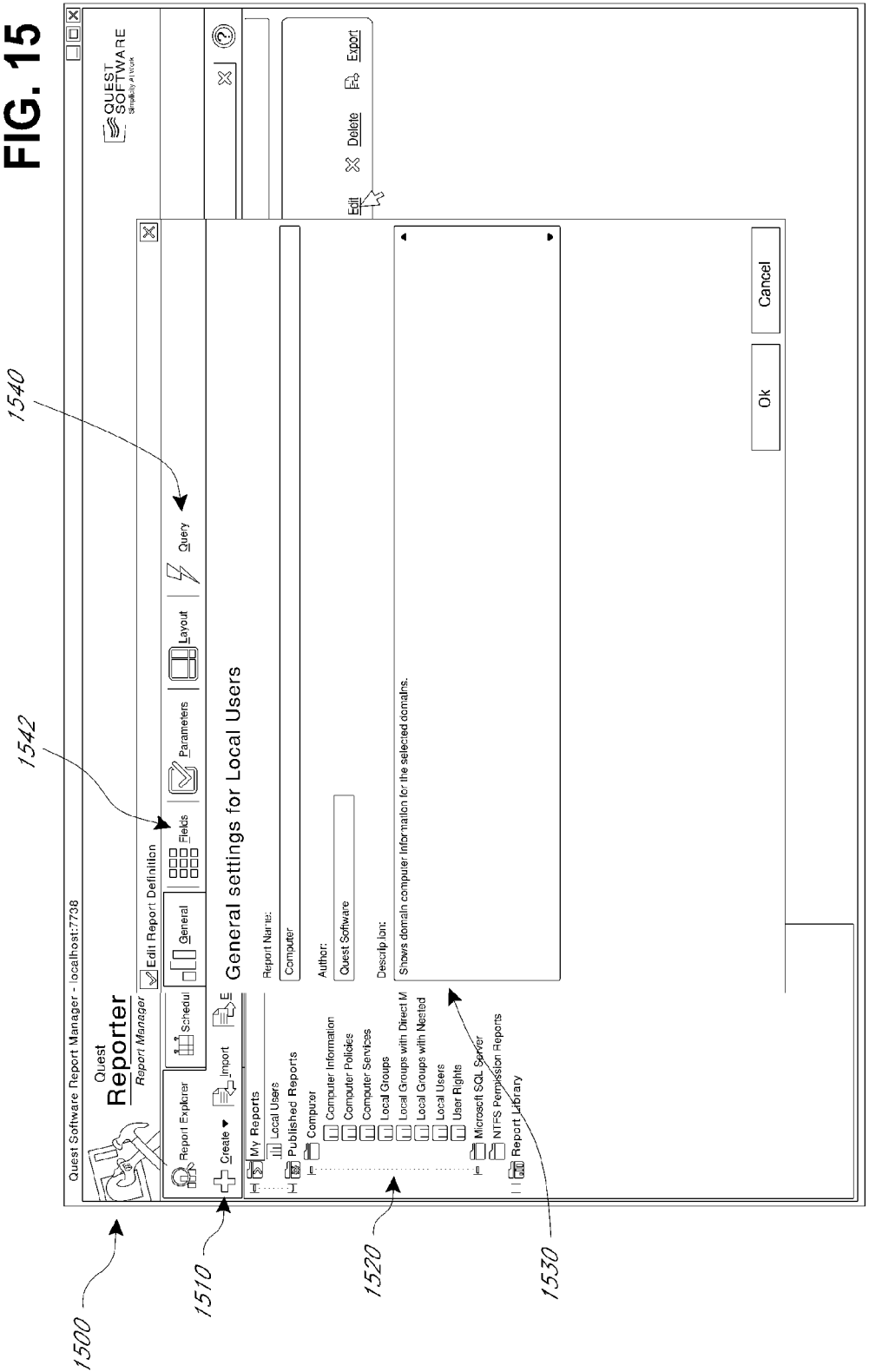

FIGS. 15 through 18 depict example custom report generation user interfaces 1500 through 1800. These user interfaces can be generated by the report generator 1214 and output to users as browser software or other application software. In FIG. 15, the user interface 1500 includes a create button 1510 or user interface control 1510 that enables a user to create a report as well as template reports 1520 that a user can select from to run or customize. In this example, a report has been selected from the template reports 1520. In response to this user selection, a popup window 1530 has been generated by the user interface 1500 to enable the user to customize the report.

The popup window 1530 shown includes the name of the report, the author, and description as well as user interface controls 1540 for customizing the report. One of these controls 1542 enables fields of the report to be selected. Selection of this user interface control 1542 can cause the user interface 1600 of FIG. 16 to be shown to the user. In the user interface 1600, a user can select fields for the report from available fields 1602. In the available field 1602, there is a hierarchy of fields including a domain field 1612 at a top level of the hierarchy, several fields or properties 1610 within the domain field 1612, as well as a domain computer field 1614 and property 1616 of the domain computer. These fields can be stored as entities and/or properties in the LDMs described above. For example, the domain field 1612 and the domain computer field 1614 can represent entities, and the properties 1612 and 1616 can be the LDM properties related to those entities.

An add and remove button control 1620 enables a user to select or remove the properties 1610, 1616 and/or entities 1612 and/or 1614 to a selected fields box 1630. The fields in the selected fields box 1630 can be used to generate the report. It should be noted that the domain computer field or entity 1614 is included within the domain field or entity 1612 and can be represented in the LDM as a "parent/child" relationship with the domain field 1612, as the domain can be a "parent" of a domain computer.

Figure 16:
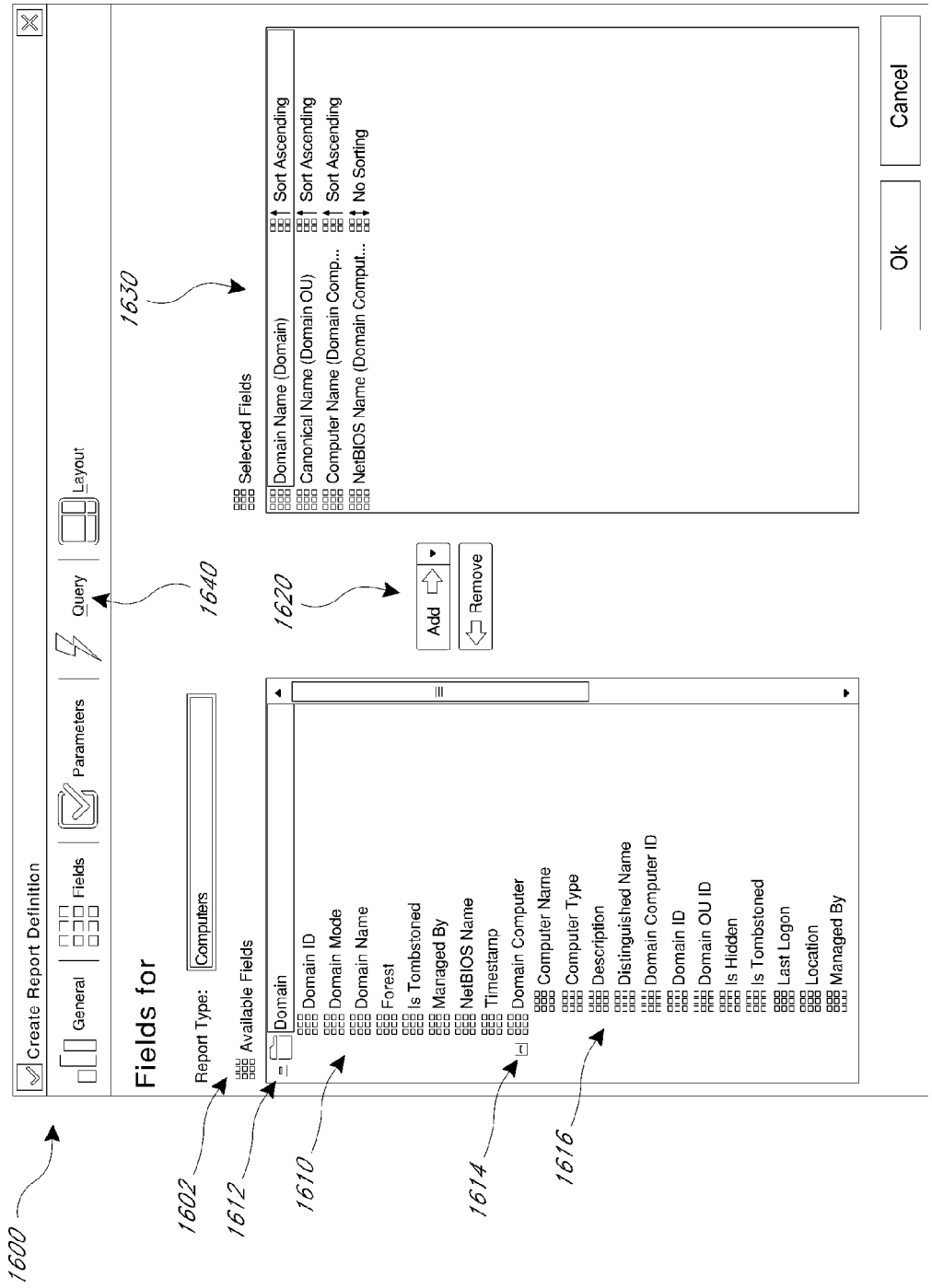
Figure 17:
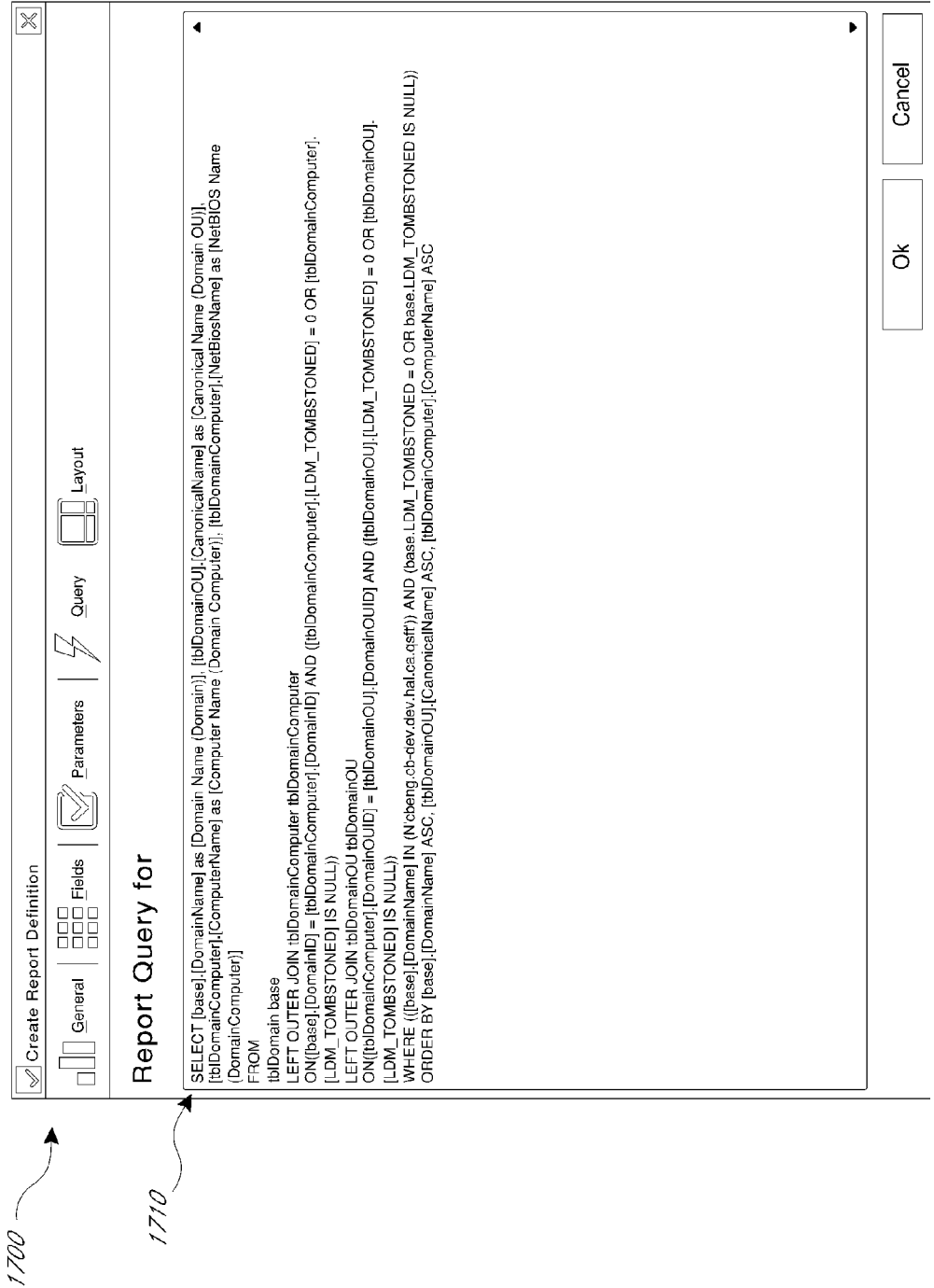

Turning to FIG. 17, a user interface 1700 is shown that depicts an example query 1710 generated based on the selected fields 1630 and the user interface 1600 of FIG. 16. The example query 1710 can be generated by the query engine described above and can be edited by a user or can be run without editing to generate the requested report. An example of such a report is shown in FIG. 18, namely a report 1800.

Figure 19:
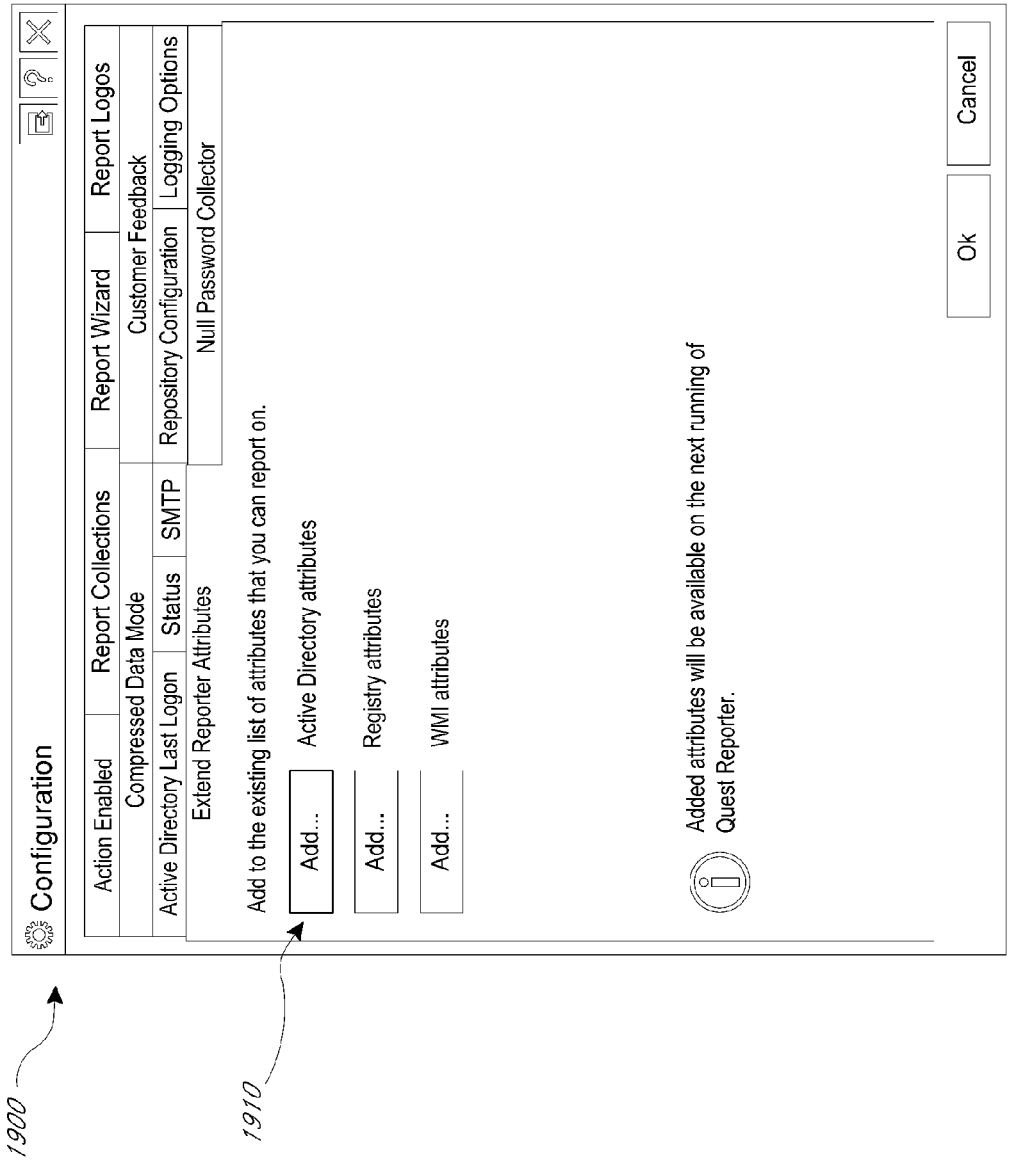

Turning to FIG. 19, an example attribute extension user interface is shown. The user interface 1900 can be generated by the attribute extender 1216 of FIG. 12 and provides various configuration options for the custom report system 1210 including user interface controls 1910 for adding attributes for various third party systems such as Active Directory™, a registry, or WMI. Selection of one of these user interface controls 1910 can cause the attribute extender 1216 to output a user interface such as the user interface 2000 of FIG. 20. The user interface 2000 is shown for extending attributes of an Active Directory™ installation and allows a user to modify which Active Directory™ attributes can be collected on via a drop down box 2010.

IV. Additional Embodiments

Although the LDM is described herein primarily in the context of a data collection system, other applications can exist for an LDM. For instance, an LDM could be used as less complex view of a database schema to address storage space issues. As storage used by a database exceeds provisioned storage capacity, the LDM can dynamically create additional tables on a new data store or move existing tables to the new data store. More generally, in certain embodiments, the LDM features described herein can serve as a replacement for existing ORM solutions. As such, in certain embodiments, LDM may be used wherever ORM is used or has a conceivable future use.

Although many embodiments have been described herein with respect to Microsoft Windows™ systems and components, some or all of the features described herein can be used with other computing systems, including, for example, systems that include operating systems such as Unix, Linux, Mac™, iOS™, Android™, or other operating systems. In addition, the various user interfaces described herein may be varied to include different types and/or number of user interface controls for performing the various functionality described herein. Moreover, any subset of the user interfaces described herein can be combined together into fewer user interfaces or subdivided into additional user interfaces.

V. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for querying a database using a logical data model, the system comprising:
 a logical data model comprising data representing a plurality of entities, each of the plurality of entities having one or more properties, and mappings to a plurality of physical database tables, the mappings configured to map the plurality of entities to the plurality of physical database tables in a physical database; and
 a query engine comprising computer hardware, the query engine configured to:
  receive, from a custom reporting application, a request for entity data of the logical data model, the requested-for entity data being related to first properties of a selected entity of the plurality of entities,
  access the logical data model to identify two or more physical database tables of the plurality of physical database tables and associated columns in the two or more physical database tables to which the first properties of the selected entity are mapped,
  construct a query to access the two or more physical database tables in the physical database,
  pass the query to a database management system to cause the query to be executed on the physical database,
  receive results of the query from the database management system, and
  provide the results of the query to the custom reporting application to thereby enable the custom reporting application to generate a report, including the results of the query, for presentation to a user,
 wherein the plurality of entities of the logical data model are dynamically bound such that updating the logical data model is performed without requiring recompilation of the logical data model or the physical database, thereby enabling the logical data model to be modified at runtime,
 wherein the logical data model stores semantic relationships between the plurality of entities that mask relational relationships between the plurality of physical database tables, and
 wherein the logical data model is configured to map an entity of the plurality of entities to multiple database tables of the plurality of physical database tables.

2. The system of claim 1, further comprising a data collector configured to collect data from a third party system and to provide the data for storage in the two or more physical database tables based on the logical data model.

3. The system of claim 1, wherein the query engine comprises one or more extension points, thereby enabling the query engine to be dynamically modified at runtime.

4. The system of claim 1, wherein the plurality of entities in the logical data model are stored in tables.

5. A system for querying a database using a logical data model, the system comprising:
 a logical data model comprising data representing a plurality of entities, each of the plurality of entities having one or more properties, and mappings to a plurality of physical database tables, the mappings configured to map the plurality of entities to the plurality of physical database tables in a physical database; and
 a query engine comprising computer hardware, the query engine configured to:
  receive, from an application, a request for entity data of the logical data model, the requested-for entity data being related to first properties of a selected entity of the plurality of entities,
  access the logical data model to identify two or more physical database tables of the plurality of physical database tables and associated columns in the two or more physical database tables to which the first properties of the selected entity are mapped, construct a query to access the two or more physical database tables in the physical database, cause the query to be executed on the physical database, receive results of the query from the physical database, provide the results of the query to the application, wherein the plurality of entities of the logical data model are dynamically bound such that updating the logical data model is performed without requiring recompilation of the logical data model or the physical database, thereby enabling the logical data model to be modified at runtime, wherein the logical data model stores semantic relationships between the plurality of entities that mask relational relationships between the plurality of physical database tables, and wherein the logical data model is configured to map an entity of the plurality of entities to multiple database tables of the plurality of physical database tables.

6. The system of claim 5, wherein the query engine is further configured to cause the query to be executed on the physical database by providing the query to a database management system.

7. The system of claim 5, wherein the query engine is further configured to construct the query by joining the two or more physical database tables.

8. The system of claim 5, wherein the query engine is further configured to select a structured query language (SQL) dialect corresponding to a SQL dialect used by the physical database.

9. The system of claim 5, wherein the semantic relationships comprise inheritance relationships.

10. The system of claim 5, wherein the semantic relationships comprise parent-child relationships.

11. The system of claim 5, wherein the semantic relationships comprise possessive relationships.

12. The system of claim 5, wherein the physical database comprises a non-relational database.

13. Non-transitory physical computer storage comprising instructions stored thereon that, when executed by one or more processors, implement components for querying a database using a logical data model, the components comprising:

a logical data model comprising data representing a plurality of entities, each of the plurality of entities having one or more properties, and mappings to a plurality of physical database tables, the mappings configured to map the plurality of entities to the plurality of physical database tables in a physical database; and a query engine configured to:

receive, from an application, a request for entity data of the logical data model, the requested-for entity data being related to first properties of a selected entity of the plurality of entities, access the logical data model to identify two or more physical database tables of the plurality of physical database tables and associated columns in the two or more physical database tables to which the first properties of the selected entity are mapped, construct a query to access the two or more physical database tables in the physical database, pass the query to the physical database to thereby cause the query to be executed on the physical database, receive results of the query from the physical database, and provide the results of the query to application, wherein the plurality of entities of the logical data model are dynamically bound such that updating the logical data model is performed without requiring recompilation of the logical data model or the physical database, thereby enabling the logical data model to be modified at runtime, wherein the logical data model stores semantic relationships between the plurality of entities that mask relational relationships between the plurality of physical database tables, and wherein the logical data model is configured to map an entity of the plurality of entities to multiple database tables of the plurality of physical database tables.

14. The non-transitory physical computer storage of claim 13, wherein the query engine is further configured to provide support for custom data types.

15. The non-transitory physical computer storage of claim 14, wherein the query engine can interpret the custom data types at runtime.

16. The non-transitory physical computer storage of claim 13, wherein each of the plurality of entities is mapped to one or more of the plurality of physical database tables.

17. The non-transitory physical computer storage of claim 13, in combination with a computer system comprising one or more physical computing devices.

18. A method of querying a database using a logical data model, the method comprising:

by a computer system comprising computer hardware:

receiving, from an application, a request for entity data of a logical data model, the logical data model comprising a plurality of entities, the requested-for entity data being related to properties of a selected entity of the plurality of entities;

accessing the logical data model to identify two or more physical database tables in a physical database and associated columns in the two or more physical database tables to which the properties of the selected entity are mapped;

constructing a query to access the two or more physical database tables in the physical database;

passing the query to a database management system configured to execute the query on the physical database;

receiving results of the query from the database management system; and providing the results of the query to the application;

wherein the plurality of entities of the logical data model are dynamically bound such that updating the logical data model is performed without requiring recompilation of the logical data model or the physical database, thereby enabling the logical data model to be modified at runtime, wherein the logical data model stores semantic relationships between the plurality of entities that mask relational relationships between a plurality of physical database tables; and wherein the logical data model is configured to map an entity of the plurality of entities to multiple database tables of the two or more physical database tables.

* * * * *